United States Patent
Lisi et al.

(10) Patent No.: US 8,381,389 B2
(45) Date of Patent: Feb. 26, 2013

(54) METHOD FOR ASSEMBLING THE ROTOR OF AN ELECTRIC MACHINE

(76) Inventors: Renzo Lisi, Carmignano (IT); Leonardo Lenzi, Catena (IT)

( * ) Notice: Subject to any disclaimer, the term of this patent is extended or adjusted under 35 U.S.C. 154(b) by 108 days.

(21) Appl. No.: 13/061,658

(22) PCT Filed: Aug. 25, 2009

(86) PCT No.: PCT/IT2009/000390
§ 371 (c)(1),
(2), (4) Date: Mar. 1, 2011

(87) PCT Pub. No.: WO2010/026611
PCT Pub. Date: Mar. 11, 2010

(65) Prior Publication Data
US 2011/0167623 A1    Jul. 14, 2011

(30) Foreign Application Priority Data
Sep. 3, 2008 (IT) .............................. FI2008A0165

(51) Int. Cl.
*H02K 15/03* (2006.01)
*H02K 1/27* (2006.01)
*H02K 1/28* (2006.01)
*H02K 21/16* (2006.01)

(52) U.S. Cl. ............. 29/598; 310/156.02; 310/156.18; 310/156.22; 310/266

(58) Field of Classification Search ............. 29/598; 310/266, 156.01, 156.02, 156.18, 156.22
See application file for complete search history.

(56) References Cited

U.S. PATENT DOCUMENTS
| 5,345,133 | A * | 9/1994 | Satake | 310/266 |
| 2003/0201686 | A1* | 10/2003 | Narita et al. | 310/211 |
| 2008/0169720 | A1* | 7/2008 | Petek | 310/156.35 |

FOREIGN PATENT DOCUMENTS
| DE | 198 38 378 A1 | 3/2000 |
| EP | 0 779 695 A | 6/1997 |
| EP | 0 779 696 A | 6/1997 |
| WO | WO 93/15547 A | 8/1993 |
| WO | WO 2008/096600 A | 8/2008 |

* cited by examiner

*Primary Examiner* — Livius R Cazan
(74) *Attorney, Agent, or Firm* — McGlew and Tuttle, P.C.

(57) ABSTRACT

A method for assembling the rotor (R) connected with a shaft (4) and made by permanent magnets (2). The method includes providing an annular flange (9); forming a plurality of fixed linear guides on the annular flange (9); positioning another annular flange (90) on the guides; and locking the second flange (90) to the guides, so that the magnets (2) are clamped, inside the guides, by the first and the second flange (9, 90). The guides are formed by inserting a rod (13) through each of passing holes (91) in the first flange (9) and locking the rods (13) to the first flange (9); fitting, on the rods (13), a body (12) having a central portion with a passing hole (121) and side arms (122); fitting a spacer (11) on each rod (13); and fitting, on each rod, a body (12) having a passing hole (121) and two arms (122).

5 Claims, 25 Drawing Sheets

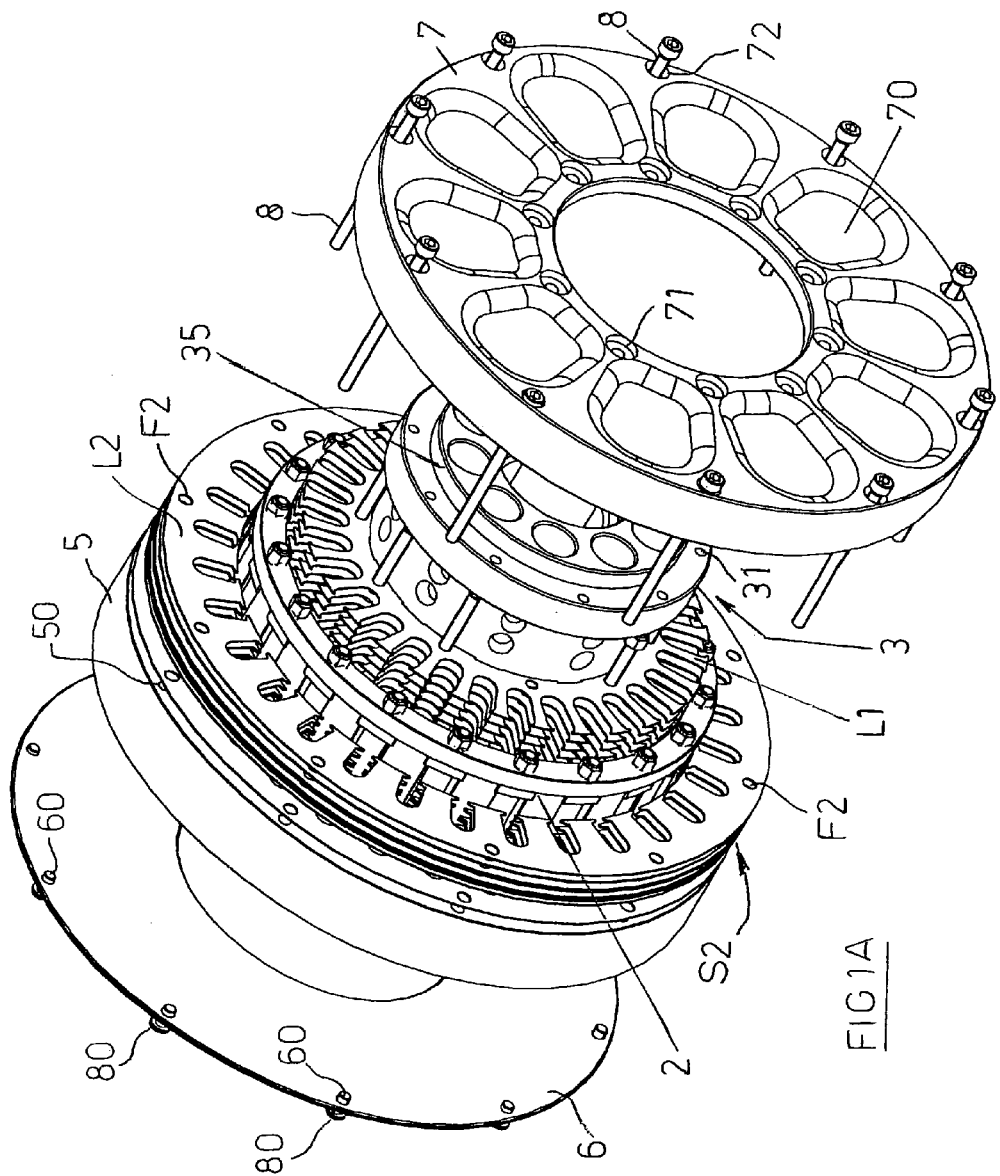

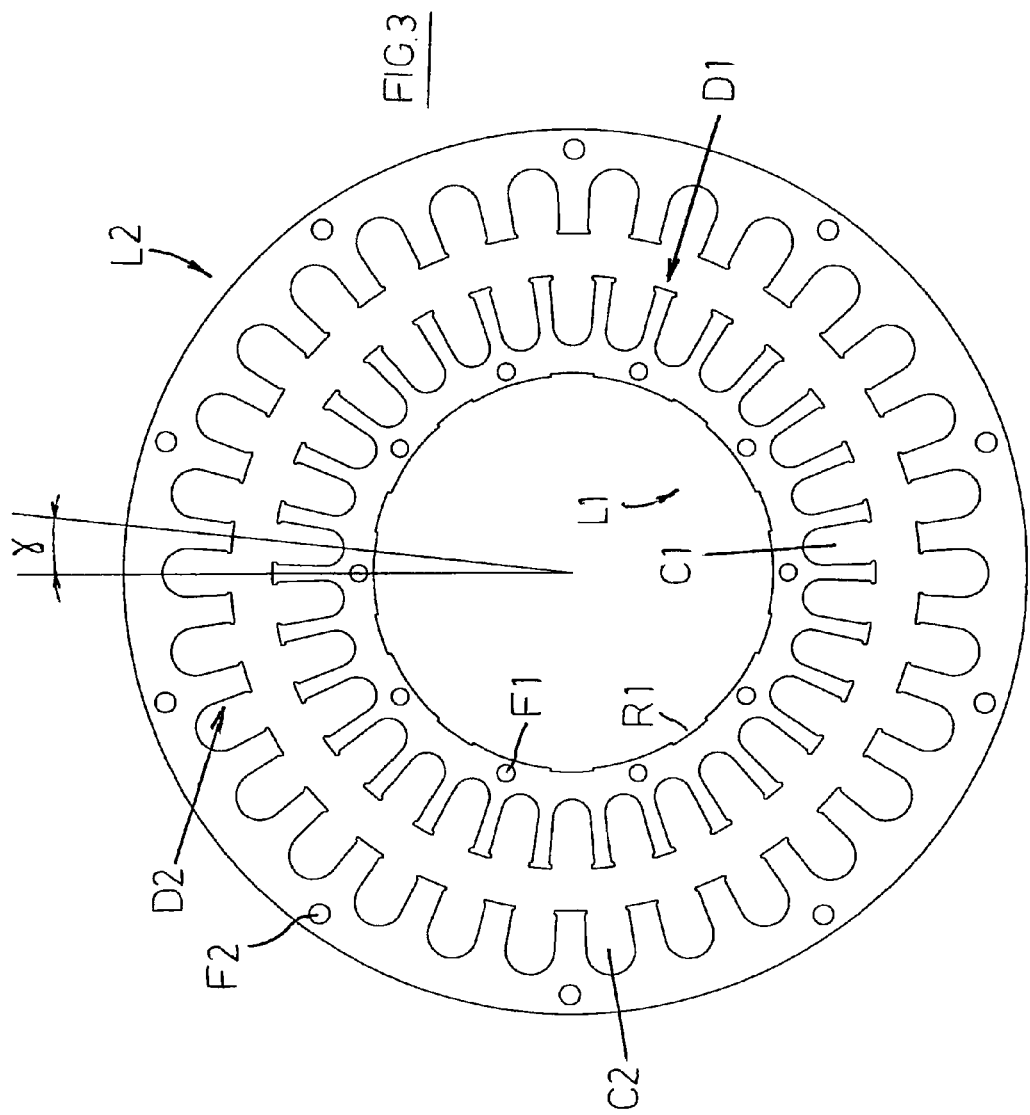

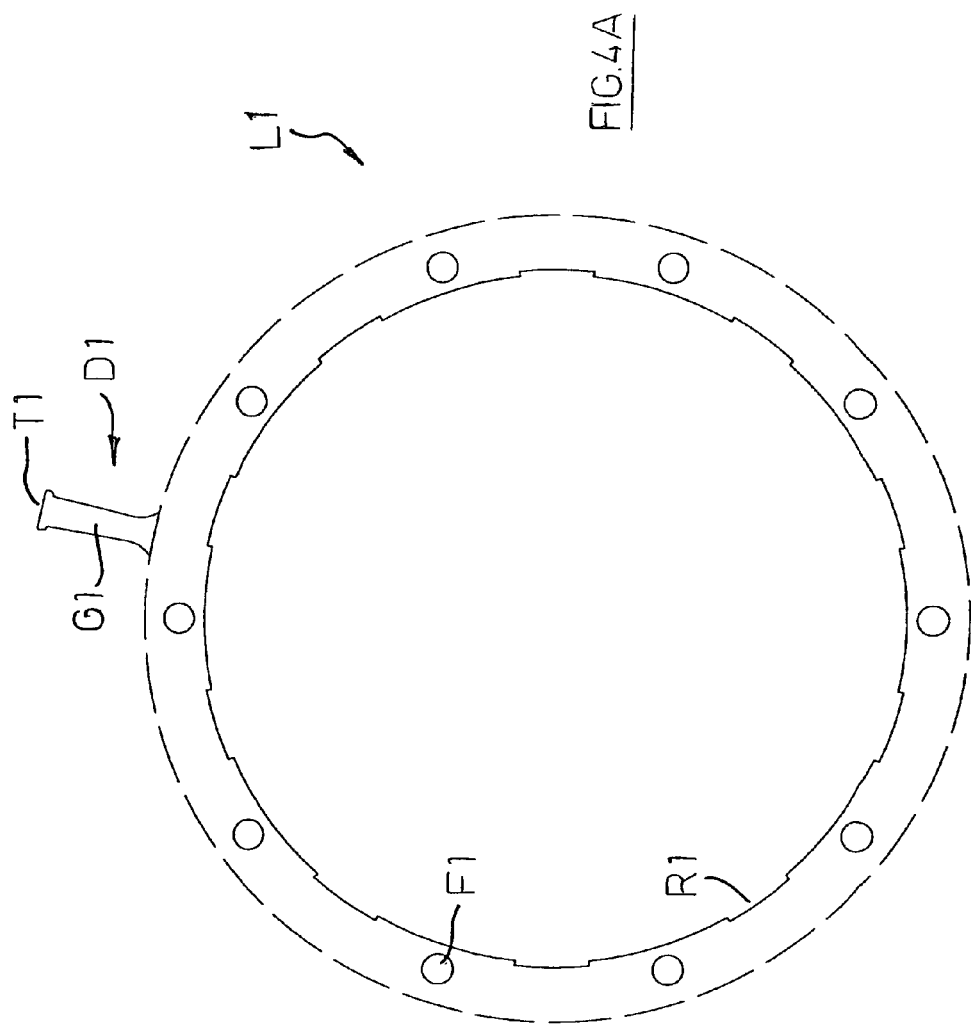

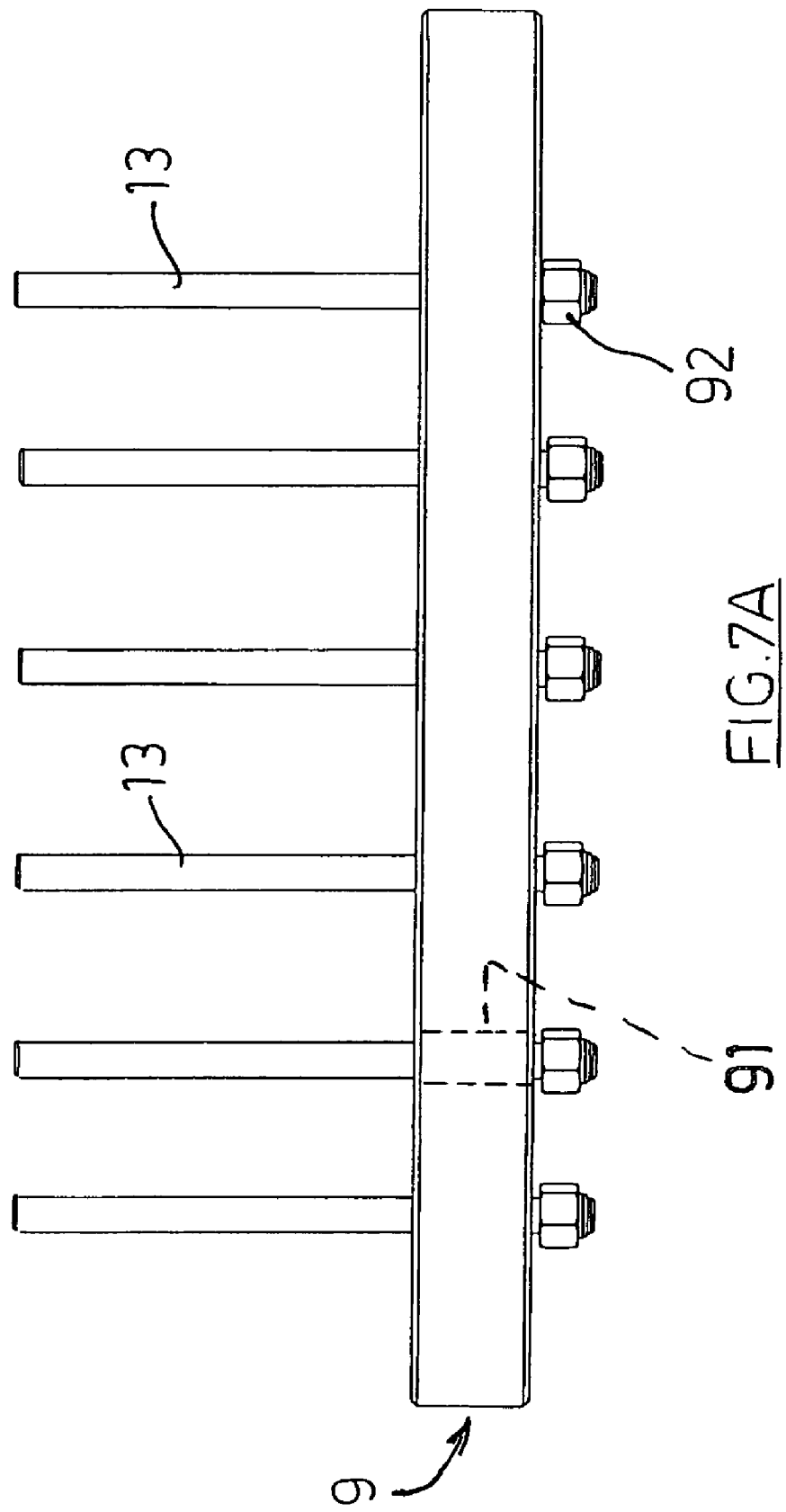

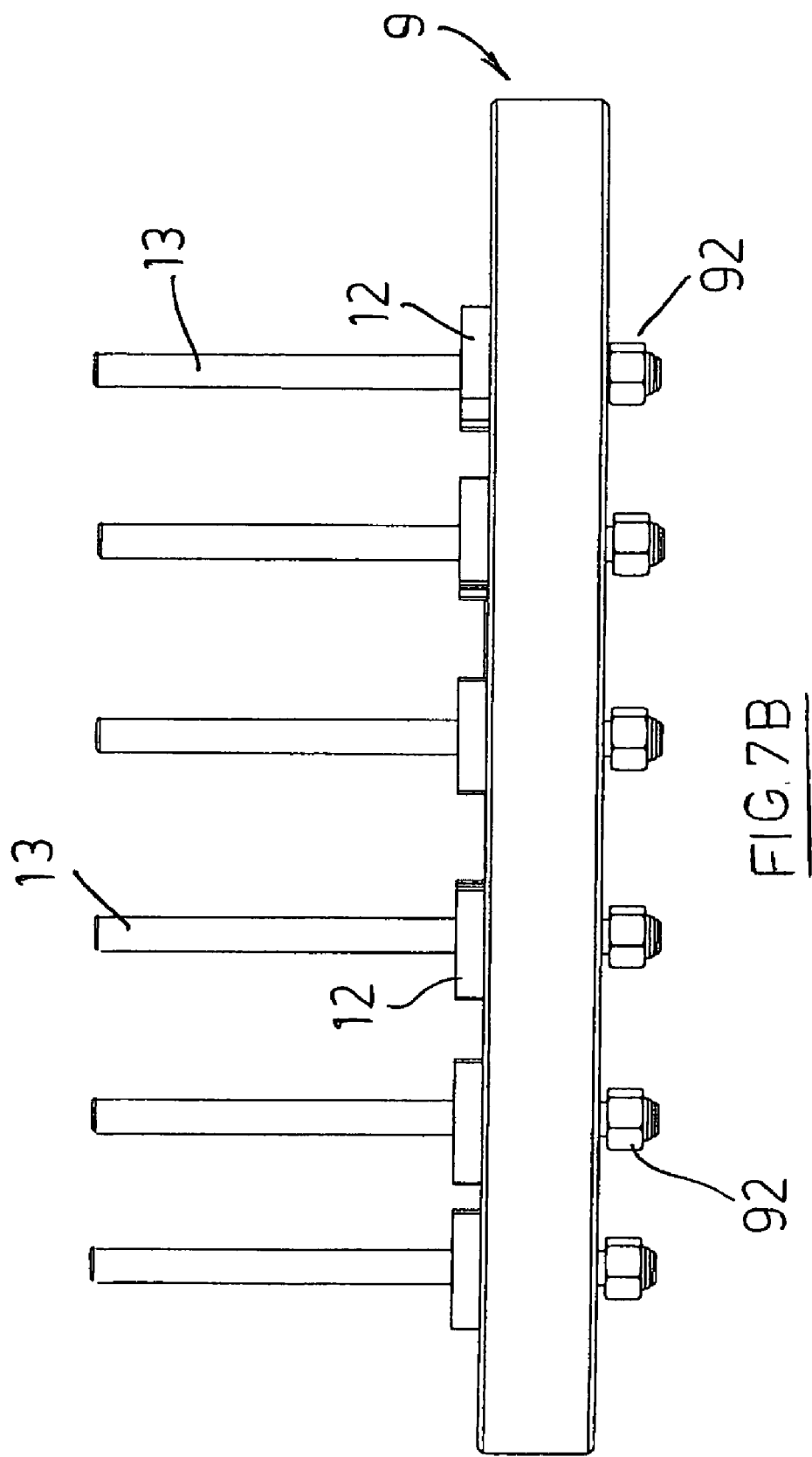

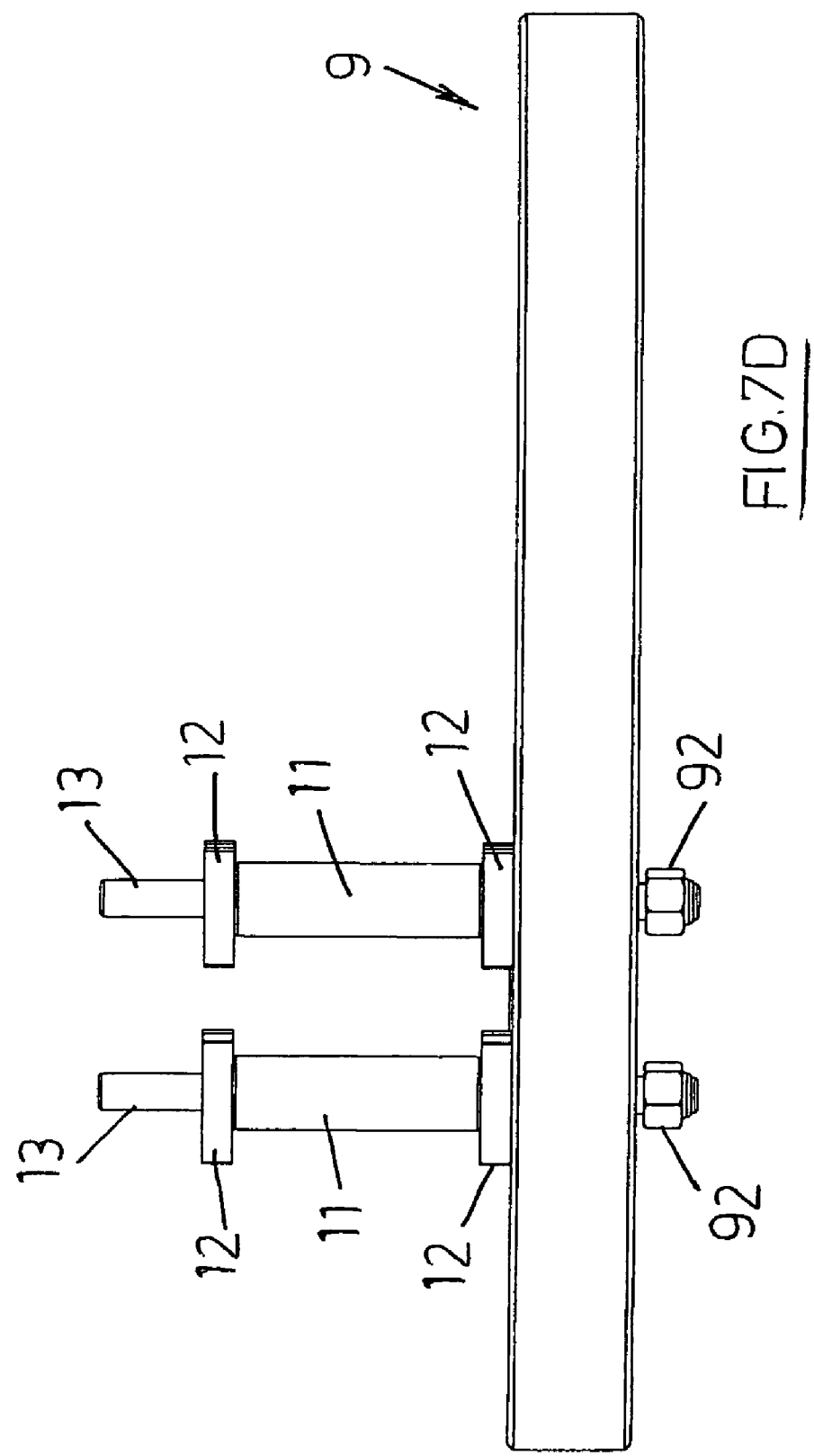

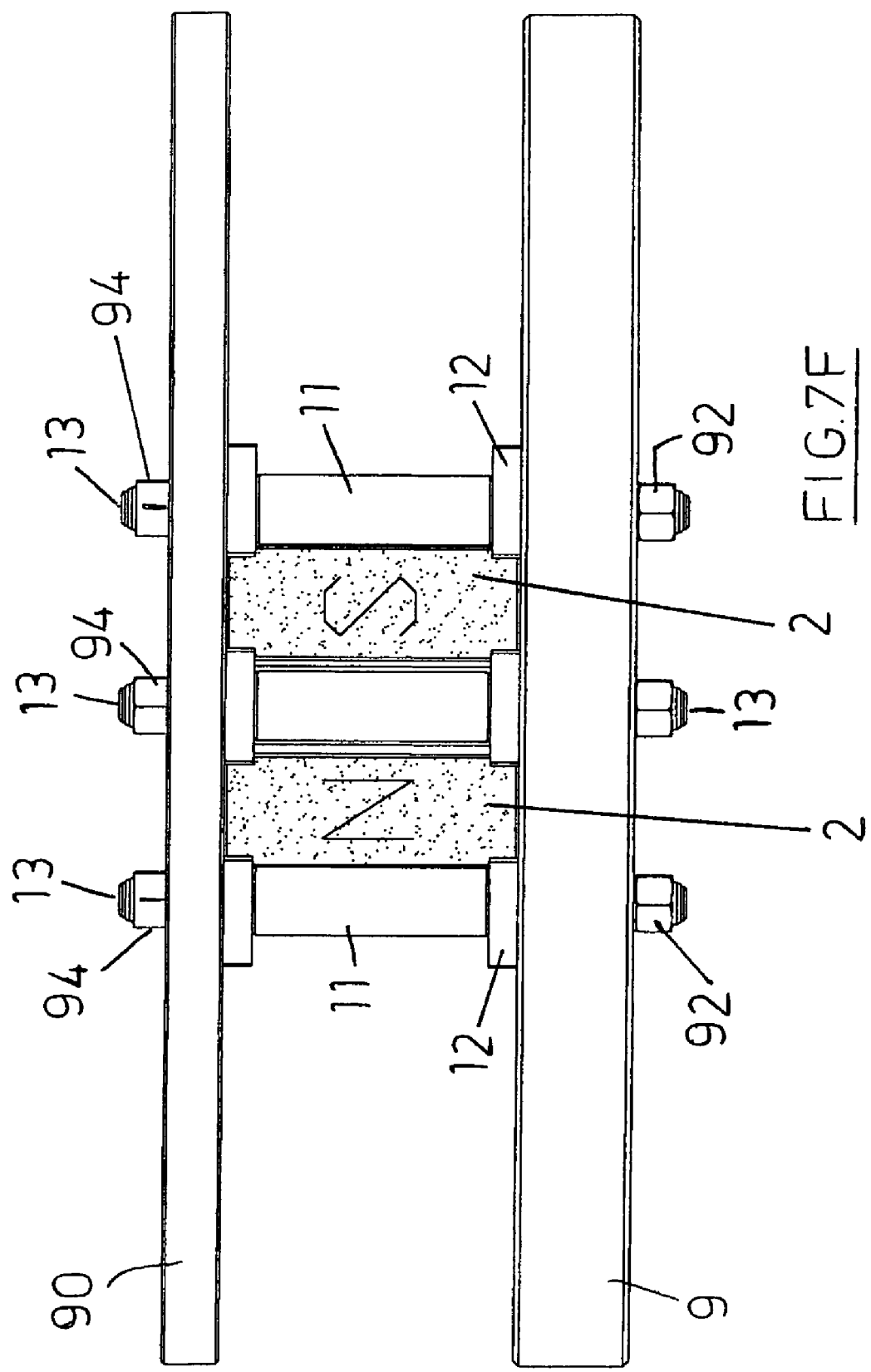

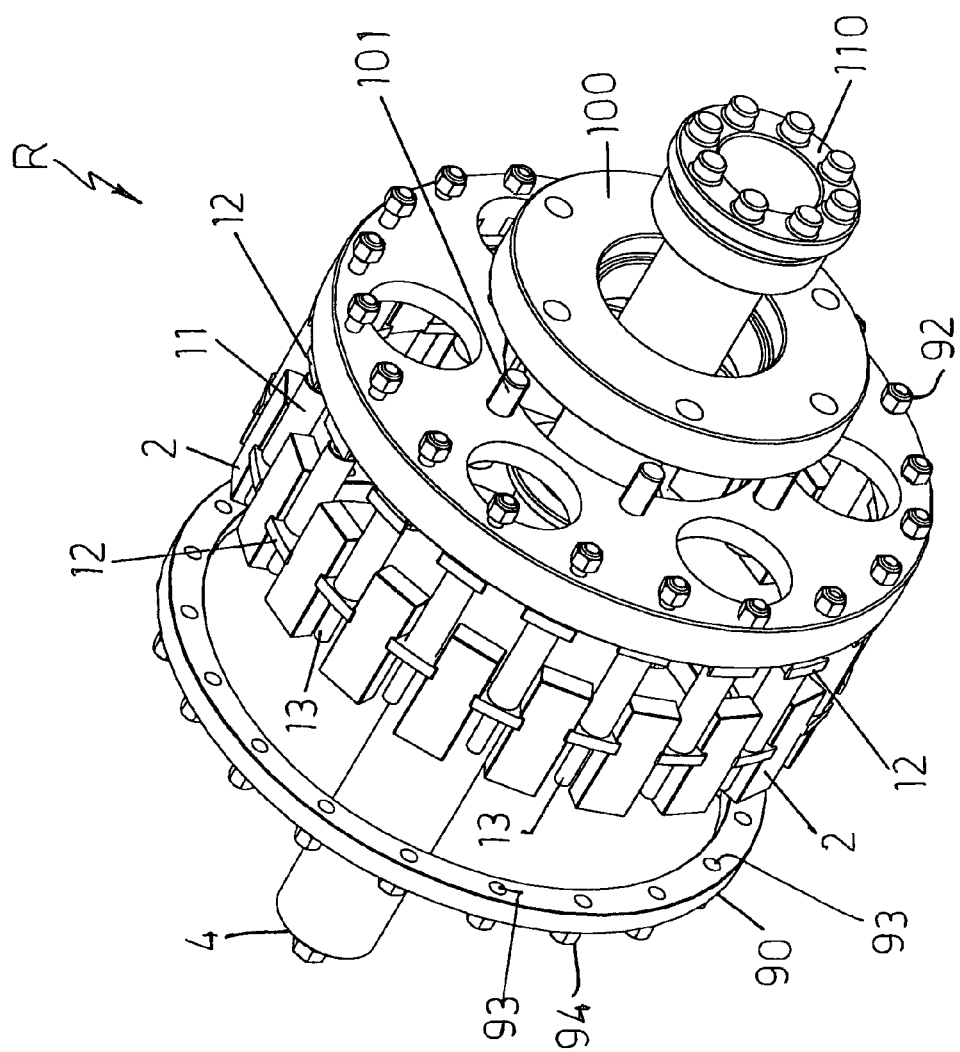

US 8,381,389 B2

METHOD FOR ASSEMBLING THE ROTOR OF AN ELECTRIC MACHINE

CROSS REFERENCE TO RELATED APPLICATIONS

This application is a United States National Phase application of International Application PCT/IT2009/000390 and claims the benefit of priority under 35 U.S.C. §119 of Italian Patent Application FI2008A000165 filed, Sep. 3, 2008.

FIELD OF THE INVENTION

The present invention relates to an electric rotary machine. In particular, the present invention advantageously concerns the production of machines such as electric generators and multi-phase synchronous motors.

BACKGROUND OF THE INVENTION

It is known that, from a constructive point of view, the electric rotary machines basically consist of two elements, one which is capable of rotating around an axis of the machine and the other which is fixed, respectively called rotor and stator. It is also known that, in synchronous machine, the angular speed of the rotor is strictly bound to the frequency of the alternate tension produced or applied, depending on whether the machine works as a generator or a motor, and the induction and induced fields rotate in synchronism without sliding.

SUMMARY OF THE INVENTION

The present invention relates to a machine of the type described above and its main purpose is to allow the realization of electric rotary machines such as high performance generators and multiphase synchronous motors. Another aim of the present invention is to simplify the assembly of electric rotary machines with particular reference to the realization of the rotor and the stator. Yet another aim of the present invention is to propose an electric rotary machine which, thanks to its constructive simplicity, is particularly reliable.

These results have been achieved according to the present invention by adopting the idea of making a machine having the features according to the invention.

An electric machine according to the present invention features a high efficiency in spite of its relative structural simplicity. Moreover, an electric machine according to the present invention is structured so as to be assembled in a very short time and more easily than conventional machines which positively reflects on the fabrication costs of the machine, with particular reference to the realization of the rotor and of the stator.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1A is a schematic exploded view of an electric machine according to the present invention wherein some parts of which are not shown to better highlight other parts;

FIG. 3 is a schematic view showing the relative disposition of two laminations of the internal and external stator core according to a possible embodiment;

FIG. 4A is a diagram showing the dimensional relationship between the teeth and the crown of the stator core laminations;

FIG. 7A is a schematic view showing an assembling procedure for the rotor of a machine according to the present invention;

FIG. 7B is a schematic view showing another assembling procedure for the rotor of a machine according to the present invention;

FIG. 7D is a schematic view showing another assembling procedure for the rotor of a machine according to the present invention;

FIG. 7F is a schematic view showing another assembling procedure for the rotor of a machine according to the present invention;

FIG. 7G is a schematic view showing another assembling procedure for the rotor of a machine according to the present invention;

DESCRIPTION OF THE PREFERRED EMBODIMENTS

Figure 5:
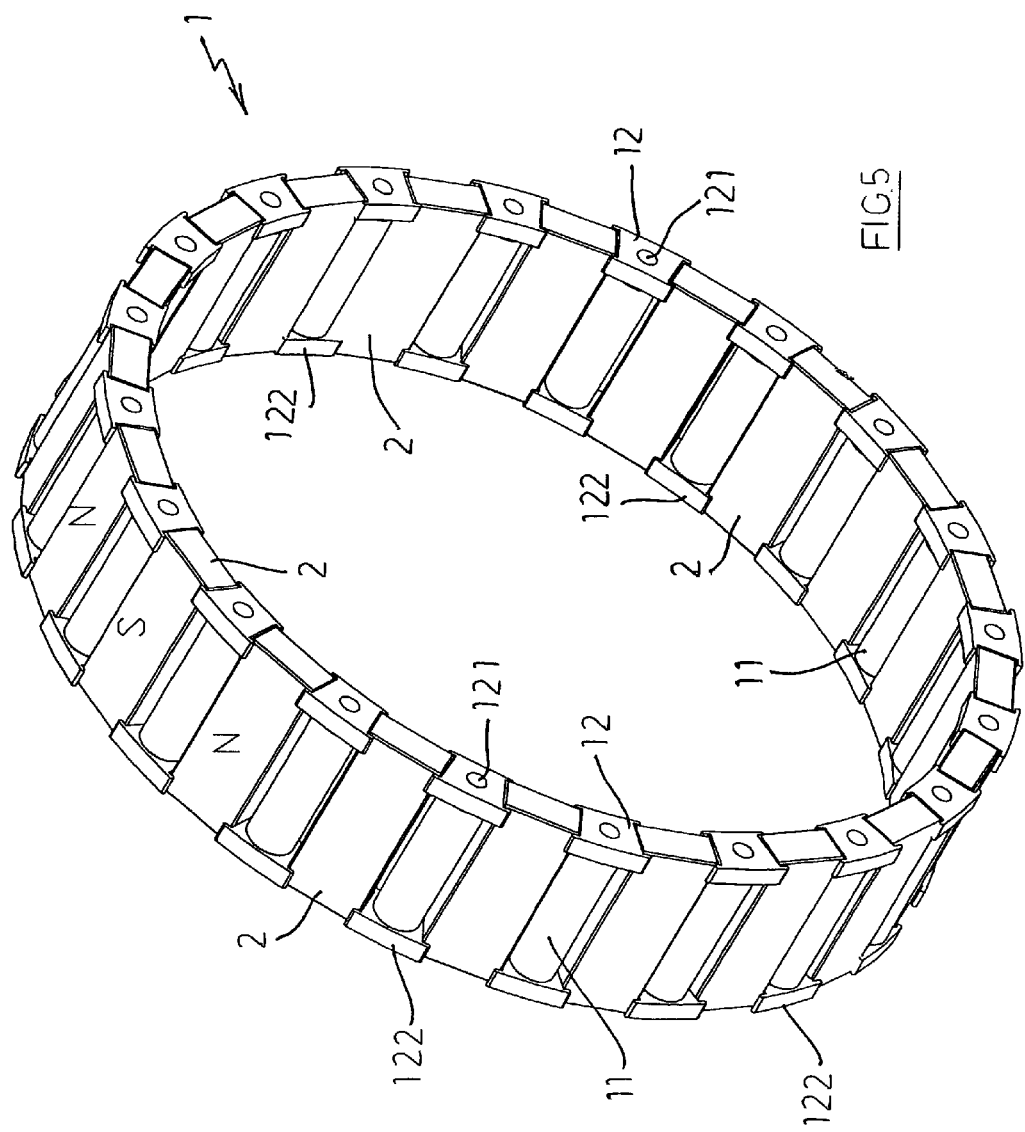
FIG. 5 shows is a schematic perspective view of the inductor.

FIG. 5 shows a rotor annular inductor (1) provided with a plurality of permanent magnets (2), as further described below, and the stator. The stator comprises two laminations cores (S1) (see FIG. 12), (S2) (see FIG. 1A) positioned coaxially to the inductor (1), one in the interior and the other on the exterior of the inductor, which are defined as "internal stator core" and "external stator core" in the following of present description. Similarly, the laminations of the internal stator core are defined as "internal laminations" and those of the external stator core are defined as "external laminations".

Figure 1B:
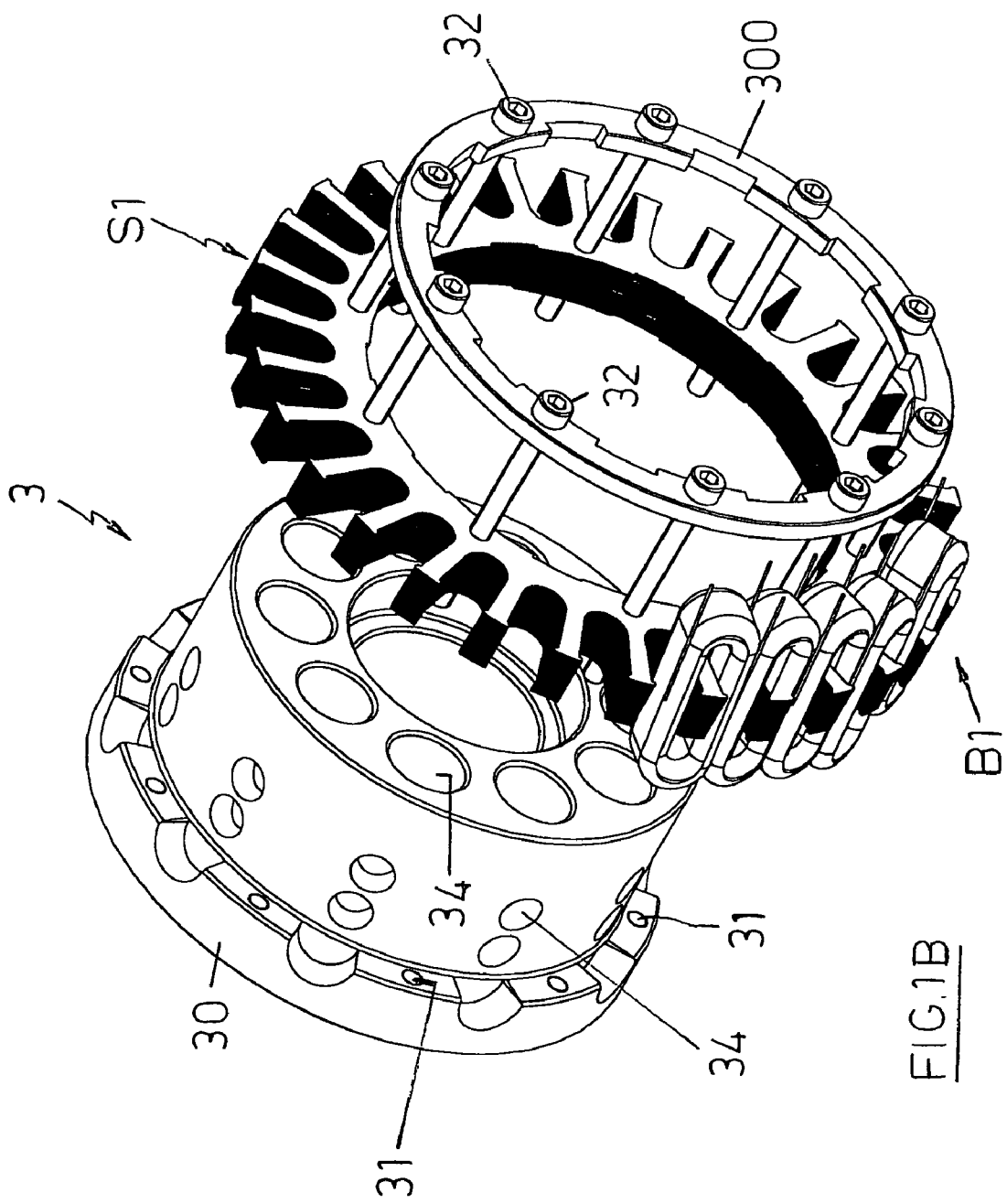
FIG. 1B is a schematic view of an assembly step regarding the mounting of the internal stator core on a support hub.
Figure 1C:
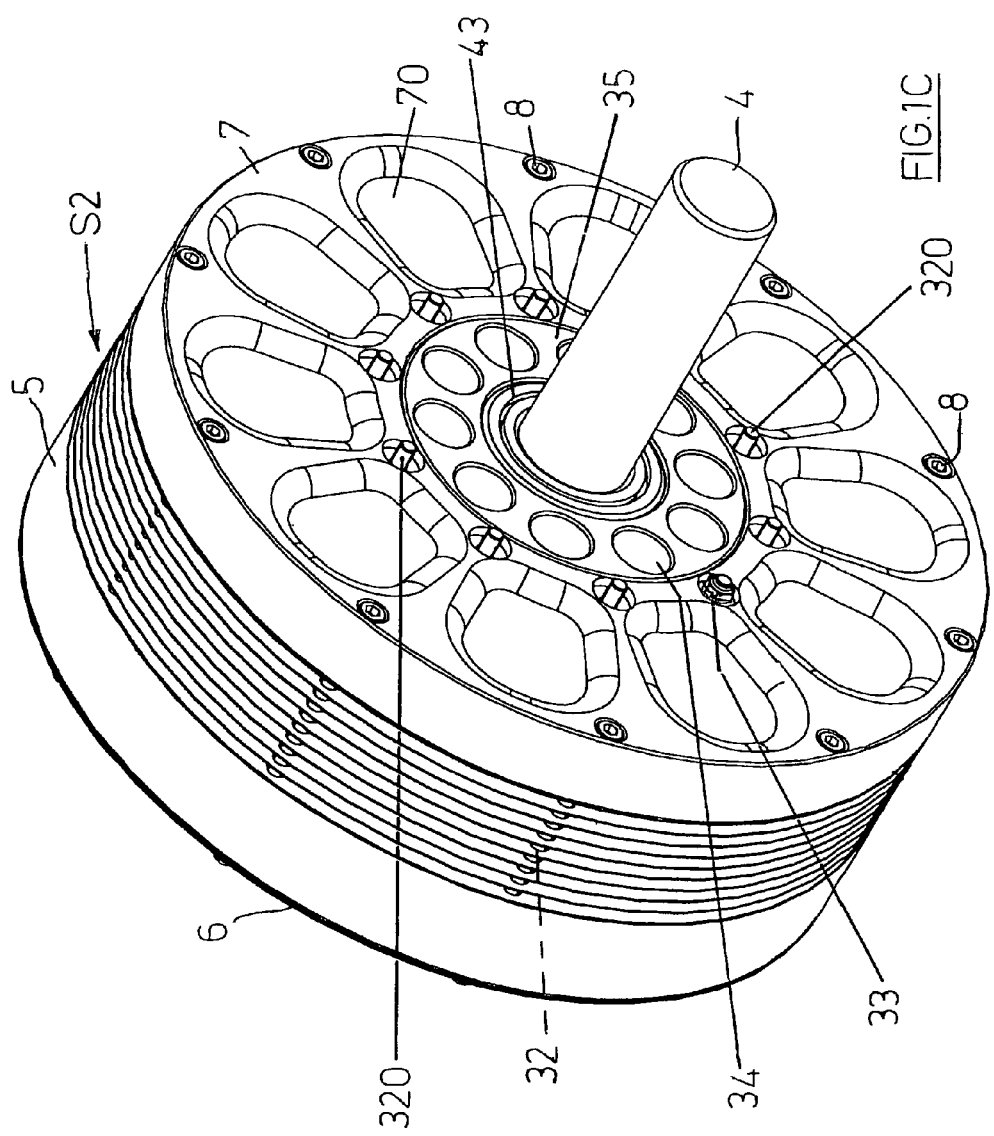
FIG. 1C is a schematic perspective view of an electric machine according to the present invention.
Figure 1D:
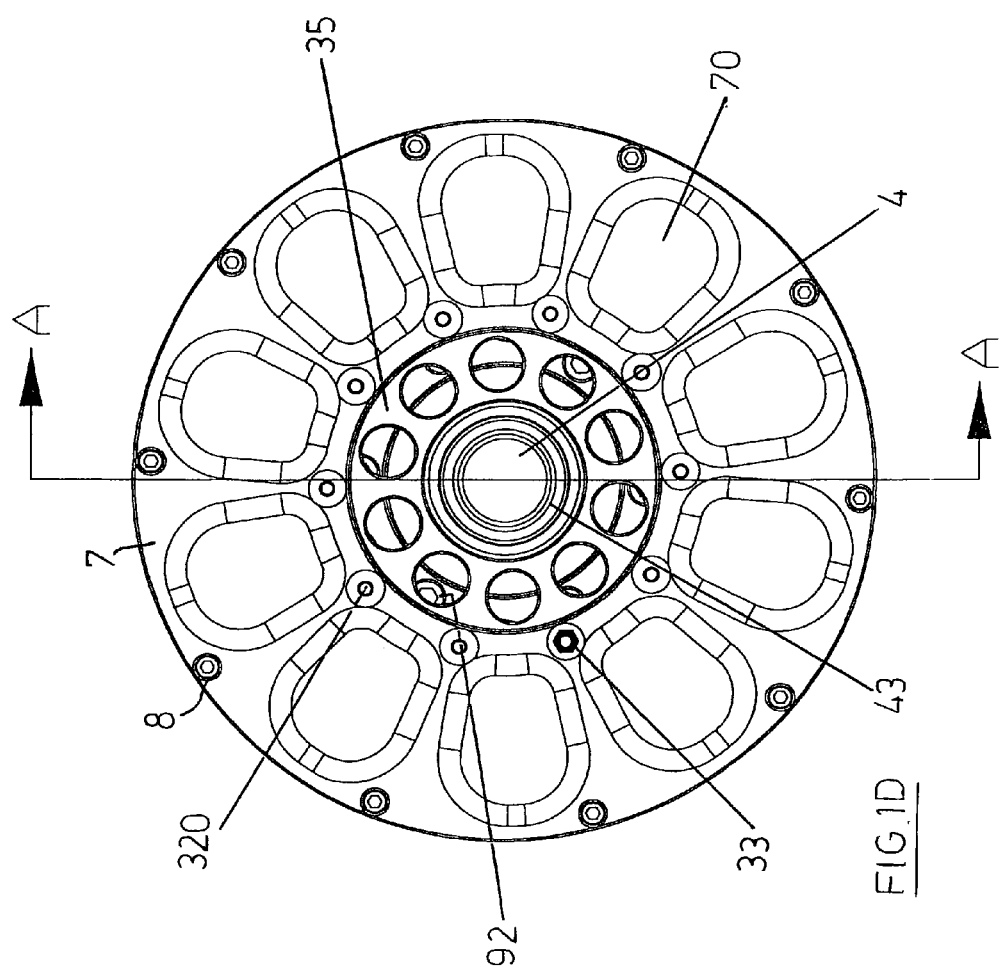
FIG. 1D is a schematic front view of the machine shown in FIG. 1C.
Figure 1E:
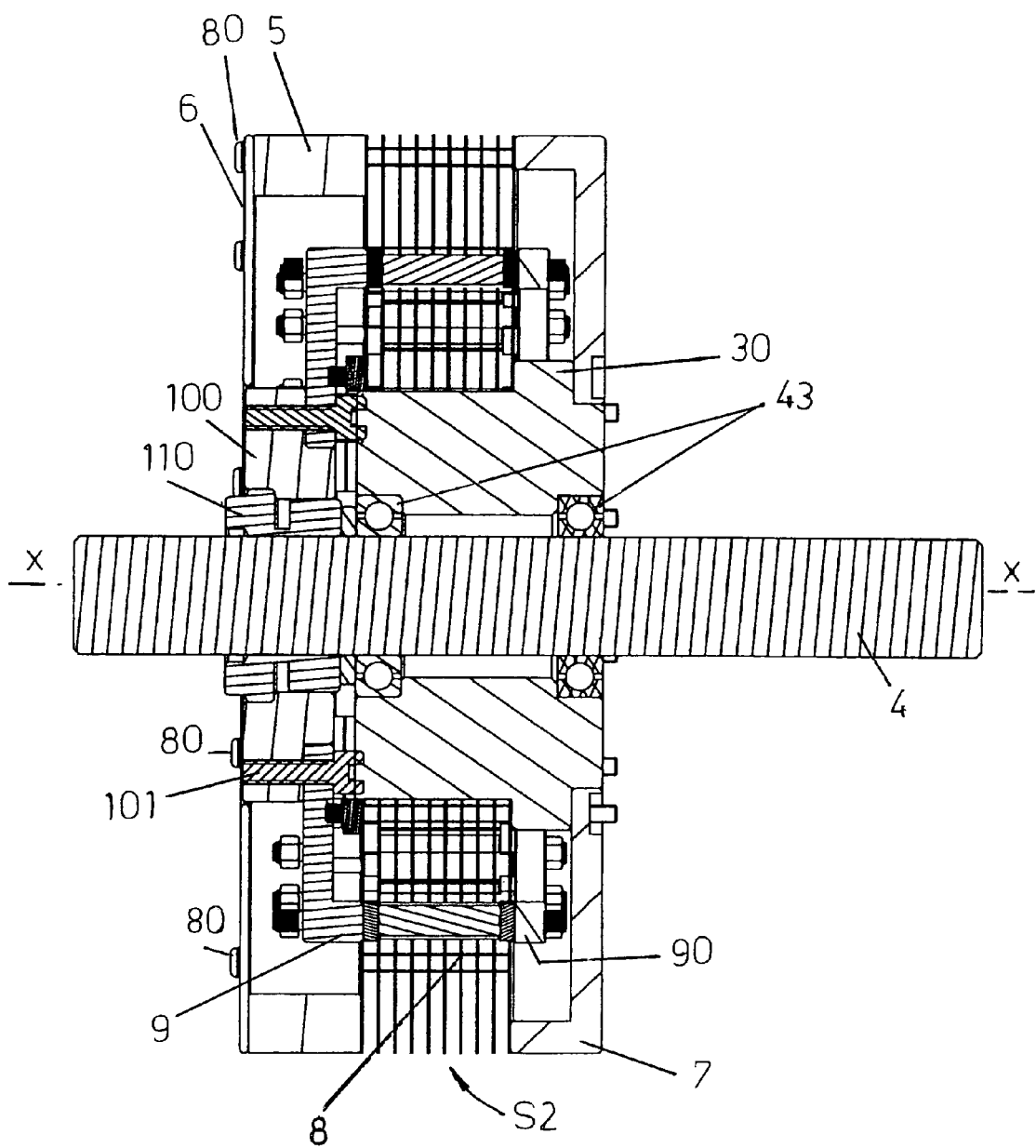
FIG. 1E is a sectional view according to line A-A of FIG. 1D.
Figure 11:
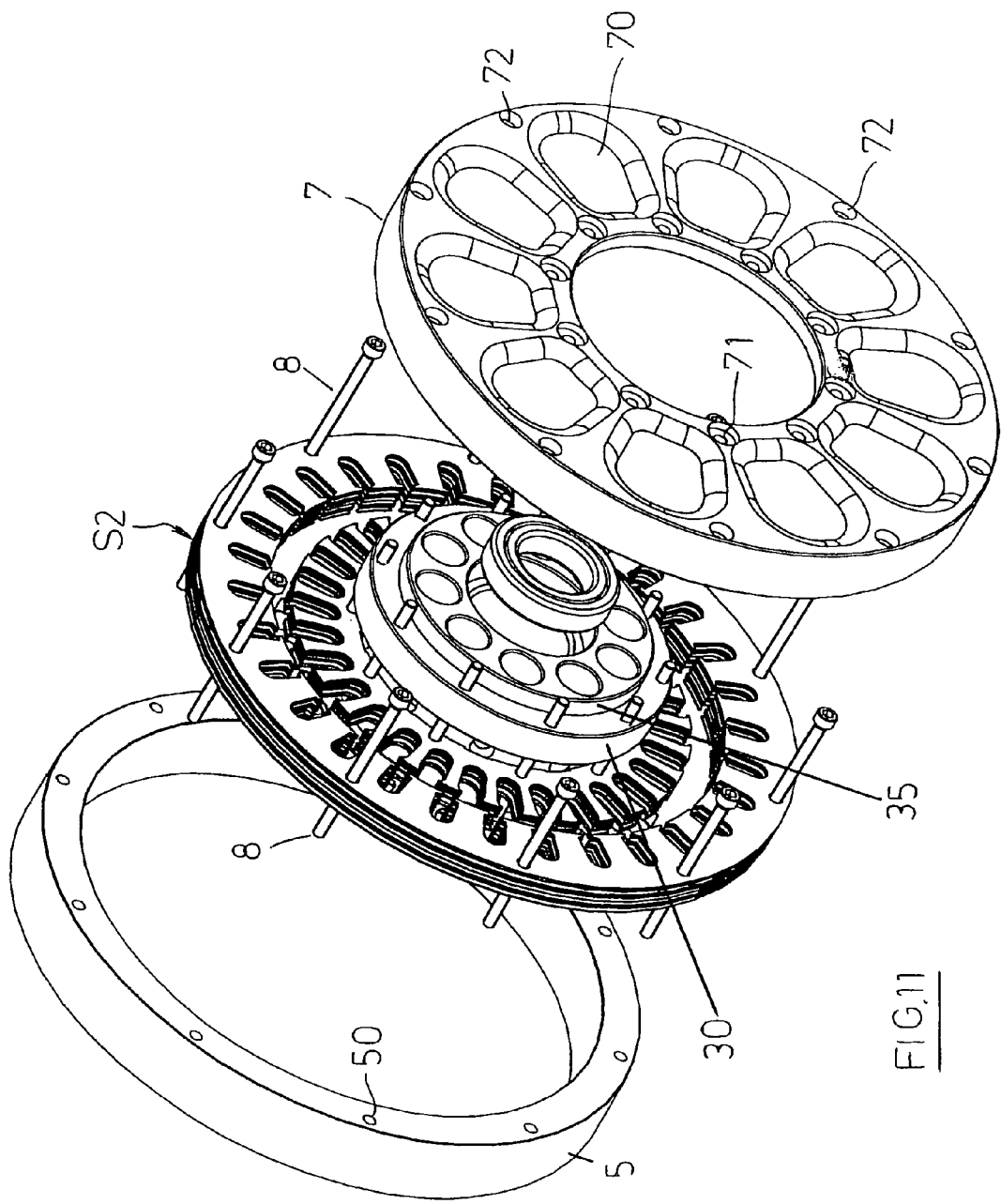
FIG. 11 is an exploded view of the internal and external stator groups in which, for simplicity's sake, the bobbins have not been shown.
Figure 12:
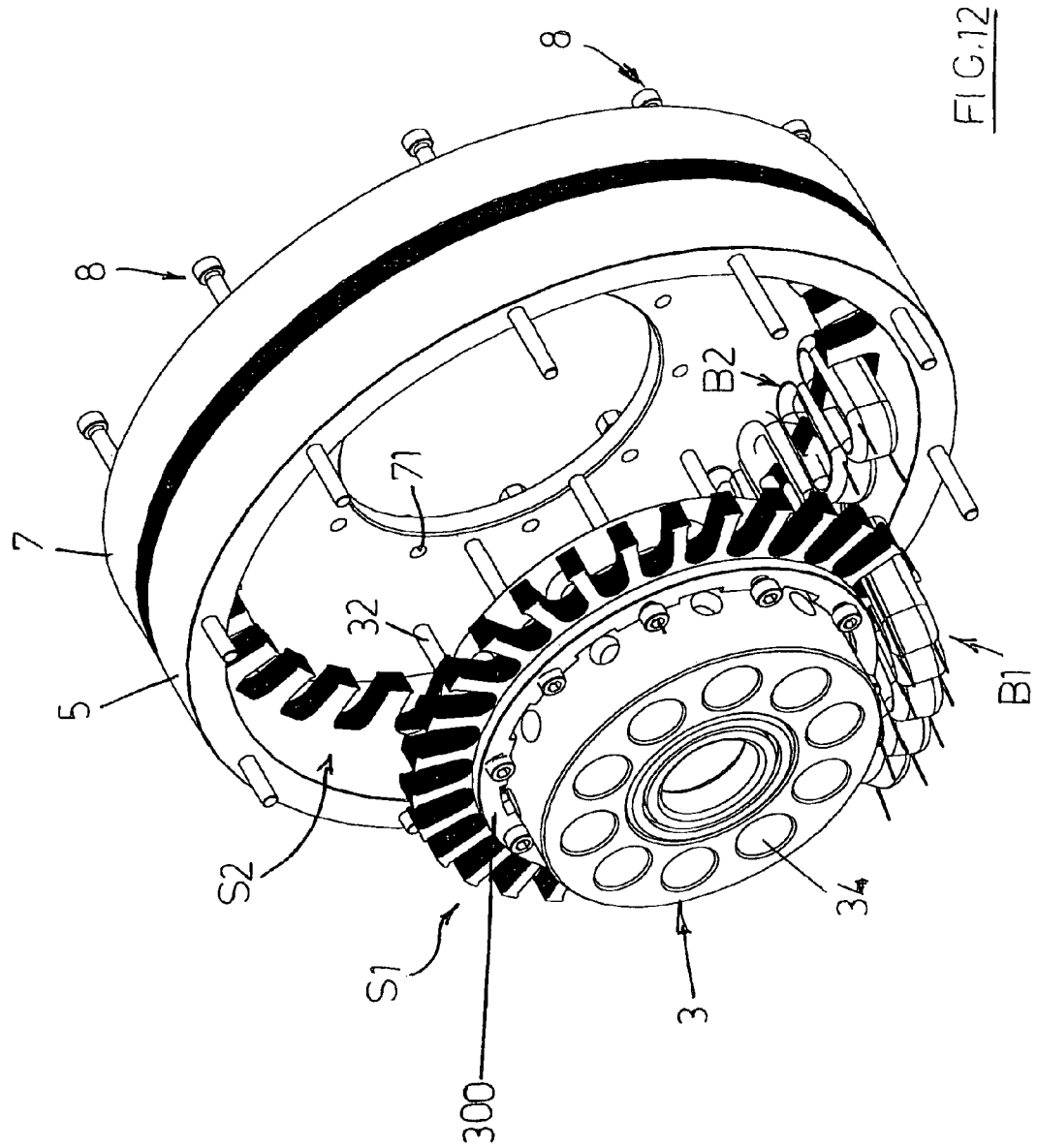
FIG. 12 is a schematic view showing a step of connecting the two stator groups.
Figure 13:
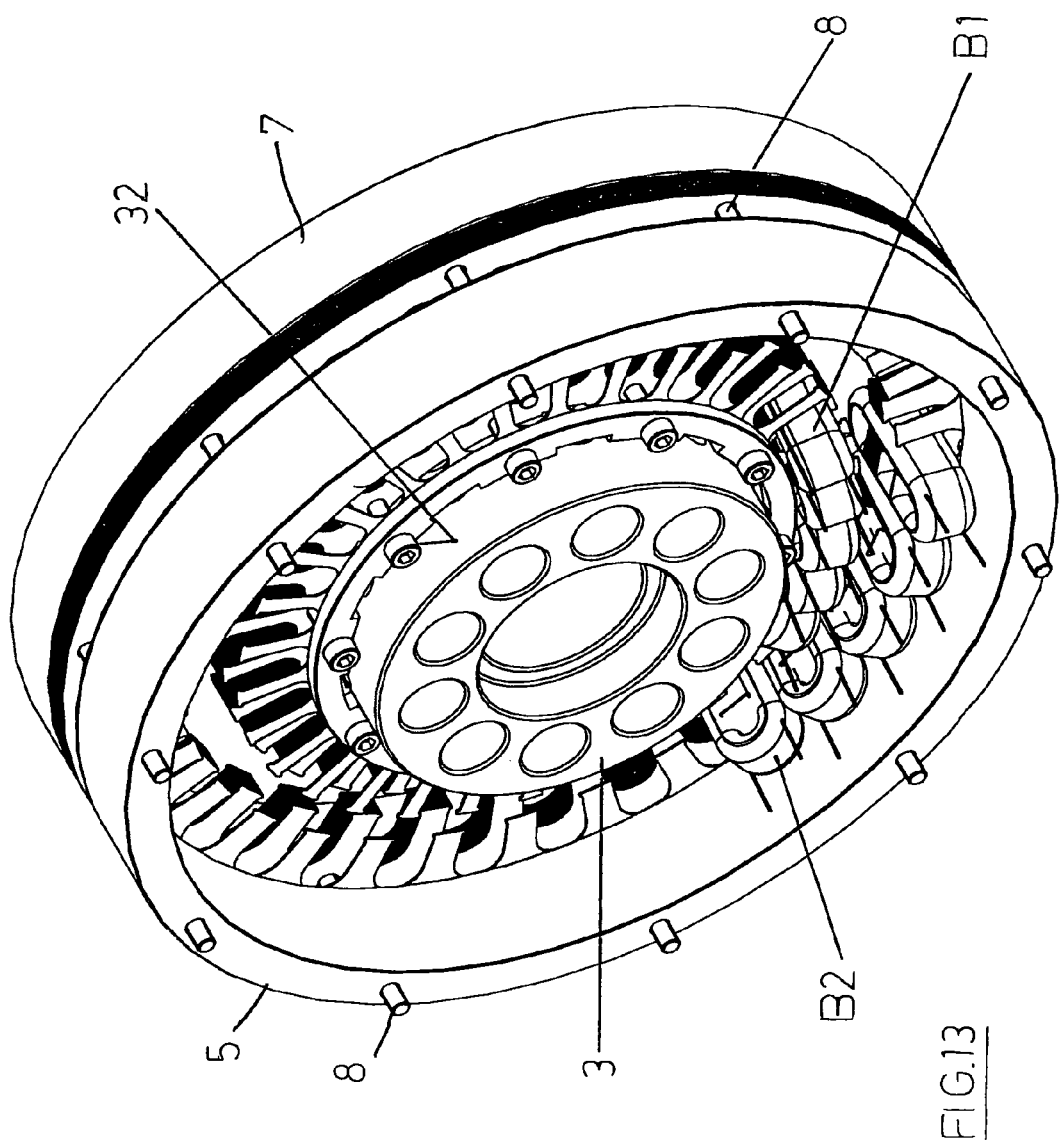
FIG. 13 is a view showing the whole of the two assembled stator groups.

FIG. 1A shows a hub (3). FIG. 12 shows the hub (3) on which the internal stator core (S1) is anchored and through which the shaft (4) (see FIG. 1C) of the machine passes, as further described below. Besides, FIG. 1A shows an annular spacer (5) provided behind the external stator core (S2) and a protection cover (6) mounted behind the spacer (5). Said spacer allows the mounting of said cover (6) without interfering with the inductor (1). On the opposite side it is provided a flange (7) which, in cooperation with said annular spacer (5), tightens and clamps the external stator core (S2). For this purpose, a plurality of bolts (8) are used and said bolts pass through corresponding holes (60, 50, F2, 72) provided on the peripheral edges of the cover (6), of the spacer (5), of the elements (L2) which constitute the external stator core (S2), and of the flange (7). Said bolts (8) are oriented parallel to the axis (x-x) (see FIG. 1E) of the machine and are disposed with their heads adjacent to the flange (7) and with their front ends jutting out beyond said cover (6) so as it is possible to screw corresponding tightening nuts (80) on them. The flange (7) features a plurality of lightning cavities (70) which, in the example shown by the enclosed drawings, are symmetrically disposed with respect to the longitudinal axis of the flange itself (7). The cover (6), the spacer (5), the laminations of the internal and external stator cores (S1, S2), the hub (3) and the flange (7) are coaxial to the axis (x-x) (see FIG. 1E) of the machine. The internal stator core (S1) is fitted onto the hub (3). Said hub, as shown in FIG. 1B, features an annular head (30) on which more threaded holes (31) are provided and a plurality of corresponding bolts (32) pass through said threaded holes. Said bolts also pass through corresponding holes (F1) (see FIG. 2) of the internal stator laminations (L1) (see FIG. 1A) and of a ring (300) positioned on the side which is opposite to said annular head (30) with respect to the laminations (L1). In this way, the core of the internal laminations (L1) is solid to the hub (3) being said core clamped between the ring (300) and the annular head (30) of the hub (3). As shown in FIG. 1C, FIG. 1D and FIG. 1E, the front ends of said bolts (32) jut out beyond the head (30) of the hub (3) so as to allow the fixing of the flange (7) mentioned above. Said flange, in fact, features a series of holes (71) (see FIG. 11) disposed on its corresponding internal edge and the front parts (320) of the bolts (32) pass through said holes. Corresponding nuts (33) are screwed on the front parts (320) of the bolts (32) and they jut out beyond the holes (71) of the flange (7); said nuts lock the flange (7) to the annular head (30) of the hub (3).

When the machine is assembled, the hub (3), the internal stator core (S1) and the ring (300) are coaxial to the axis (x-x) of the machine.

An annular step (35), whose height is equal to the depth of the central opening of the flange (7), that is to say to the thickness of the front face of said flange, is provided on the external side of the hub head (3). During assembly of the stator groups (as shown in FIG. 12), said annular step (35) is coaxially positioned into the central opening of the flange (7) which, therefore, acts as a guiding element and facilitates the assembly operations.

Said hub (3) features a plurality of longitudinal and radial holes (34) which allow the passage of air inside the machine and, as a consequence, its cooling.

Figure 2:
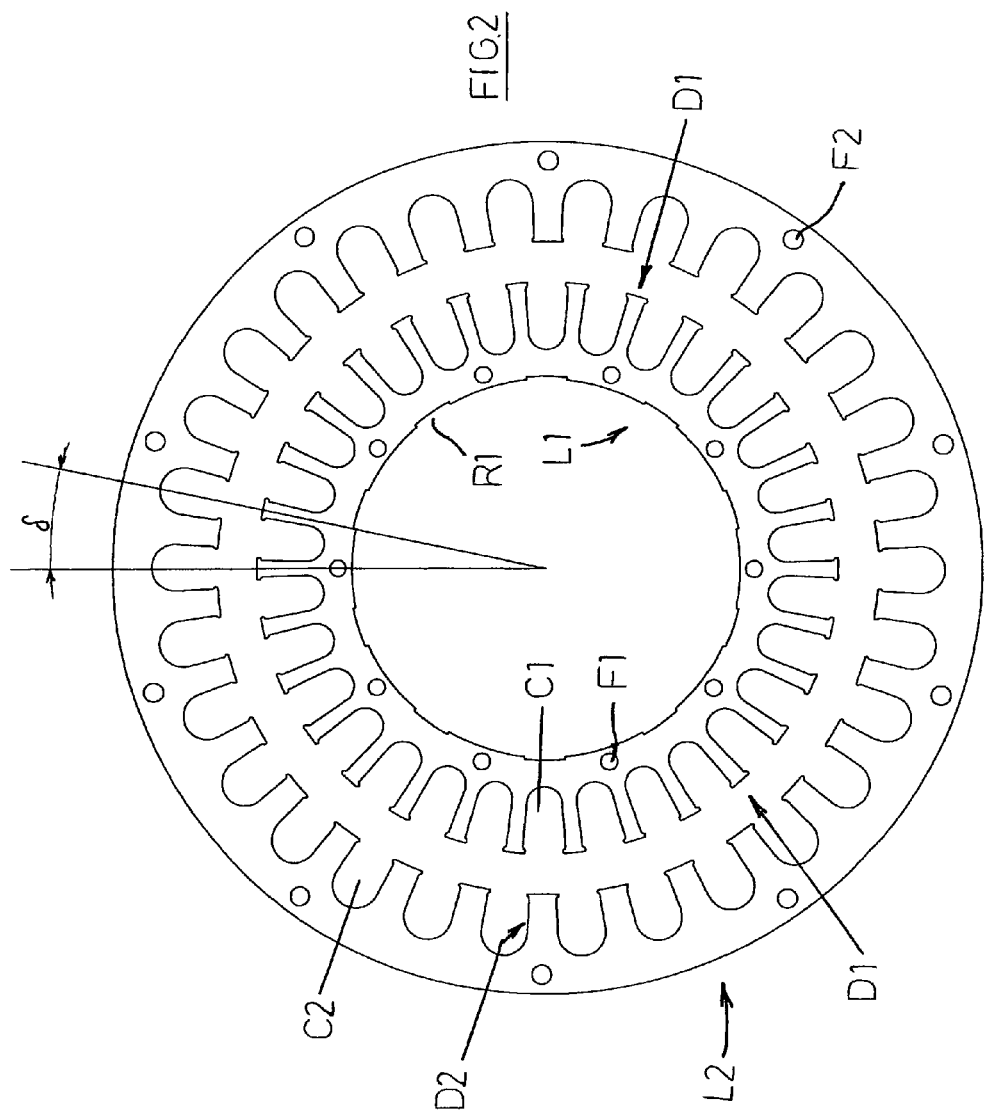
FIG. 2 is a schematic view showing the relative disposition of two laminations of the internal and external stator core according to a possible embodiment.

FIGS. 2 and 3 show two laminations (L1, L2) of the internal (S1) and external (S2) stator cores. Said laminations feature a circular profile and they are shaped so that each of them features a plurality of radial cavities (C1, C2). More precisely, each lamination (L1) of the internal stator core features a plurality of external radial cavities (C1), that is, provided on the external side of the lamination, and thus turned toward a corresponding lamination (L2) of the external stator core. Vice versa, each lamination (L2) of the external stator core (S2) features its respective cavities (C2) on the respective internal side and, therefore, turned toward a corresponding lamination (L1) of the internal stator core (S1). Each of said cavities (C1, C2) is laterally delimited by two teeth (D1, D2) which jut out radially from a corresponding annular portion of the two laminations (L1, L2). The teeth (D1) of the internal laminations (L1) jut out centrifugally toward the exterior from their corresponding annular portion of the internal laminations (L1). The teeth of the external laminations (D2), instead, jut out centripetally toward the interior from their corresponding annular portion of the lamination (L2). Therefore, said teeth (D1, D2) are inside the space delimited by the annular portions of the laminations (L1, L2). The teeth (D1) of the internal laminations (L1) are aligned with the center line of the cavities (C2) of the external laminations (L2) and, vice versa, the teeth (D2) of the external laminations (L2) are aligned with the center line of the cavities (C1) of the internal laminations (L1). In practice, each tooth (D1, D2) is positioned in front of a corresponding cavity (C2, C1).

The plant surface area of each cavity (C1) is equal to the plant surface area of each cavity (C2).

With reference to the example shown in FIG. 2 and in FIG. 3, the angle ($\delta$) between two adjacent teeth of the internal lamination (L1) is equal to 12°, and the angle ($\gamma$) between the longitudinal axis of a tooth (D1) of the internal lamination and the longitudinal axis of a tooth (D2) of an external lamination delimiting one side of the opposite cavity (C2) is equal to 6°.

The internal laminations (L1) feature a series of indentations (R1) along their respective internal edges which, when the inner stator core (1) is on the hub (3), form a series of corresponding channels between the surface of the hub (3) and the internal stator core so as to facilitate air circulation and, as a consequence, the cooling of the machine, also for the provision of the radial holes (34) of the hub (3). In fact, as schematically shown in FIGS. 1A, 1B, 11 and 12, the channels formed by the above indentations (R1) are on the radial holes (34) of the hub (3).

Figure 4B:
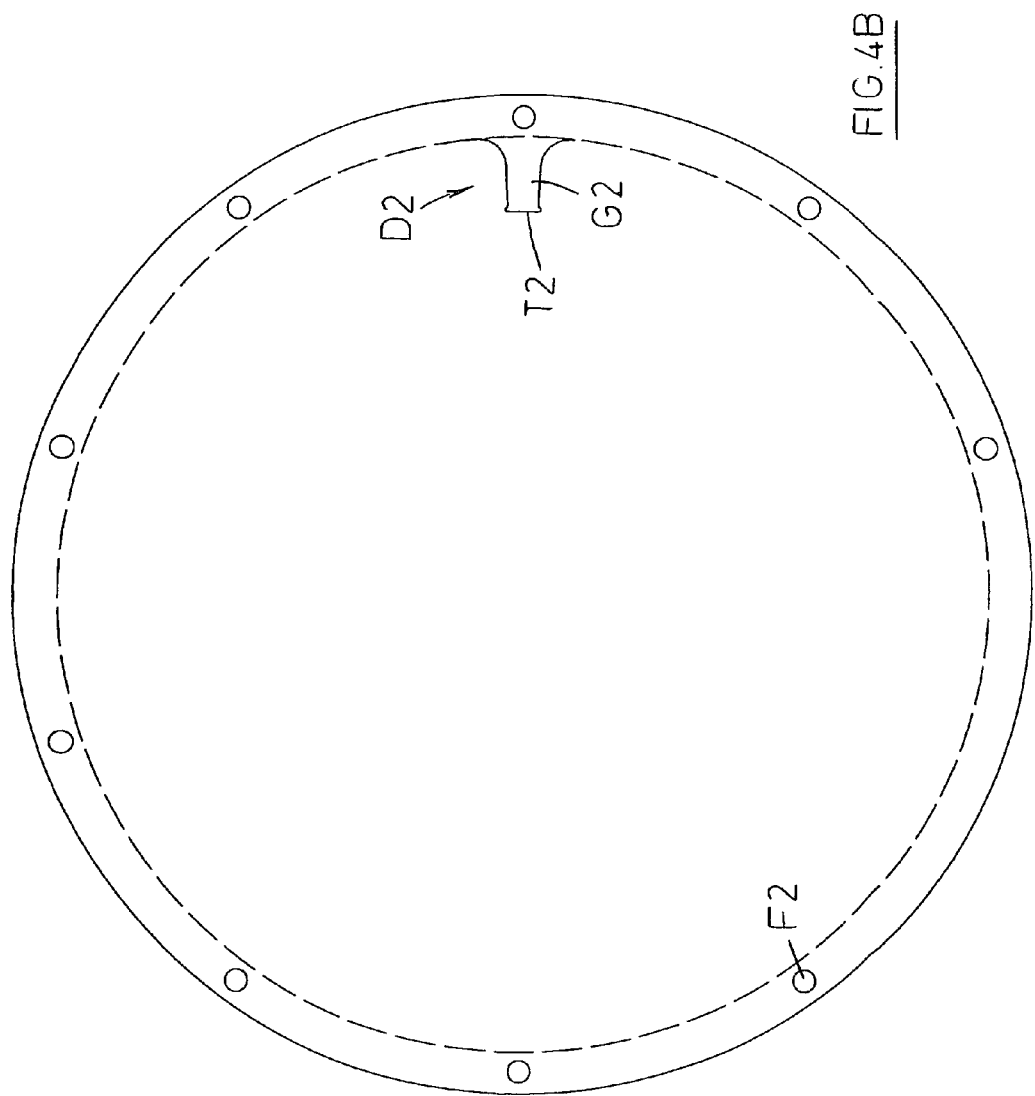
FIG. 4B is another diagram showing the dimensional relationship between the teeth and the crown of the stator core laminations.

With reference to the diagrams of FIG. 4A and FIG. 4B in which one tooth (D1, D2) is ideally shown isolated from the other teeth of the lamination (L1, L2) to better highlight the annular portions of the laminations (L1, L2), the area of the annular part is "n" times greater than the area of the tooth (D1, D2) where "n" is the number of teeth (D1, D2). In other words, if the area of the annular part of a lamination (L1) or (L2) is "AC" and if the area of a corresponding tooth (D1) or (D2) is "AD", it is AC/AD=n. According to the example shown in the drawings, it is n=30.

Each tooth (D1, D2) features a stem (G1, G2) for its connection to the annular portion of a respective lamination (L1, L2) and a larger head portion (T1, T2). In other words, each tooth (D1, D2) features an expansion (T1, T2) at its end facing the opposed lamination (L2, L1).

Figure 6:
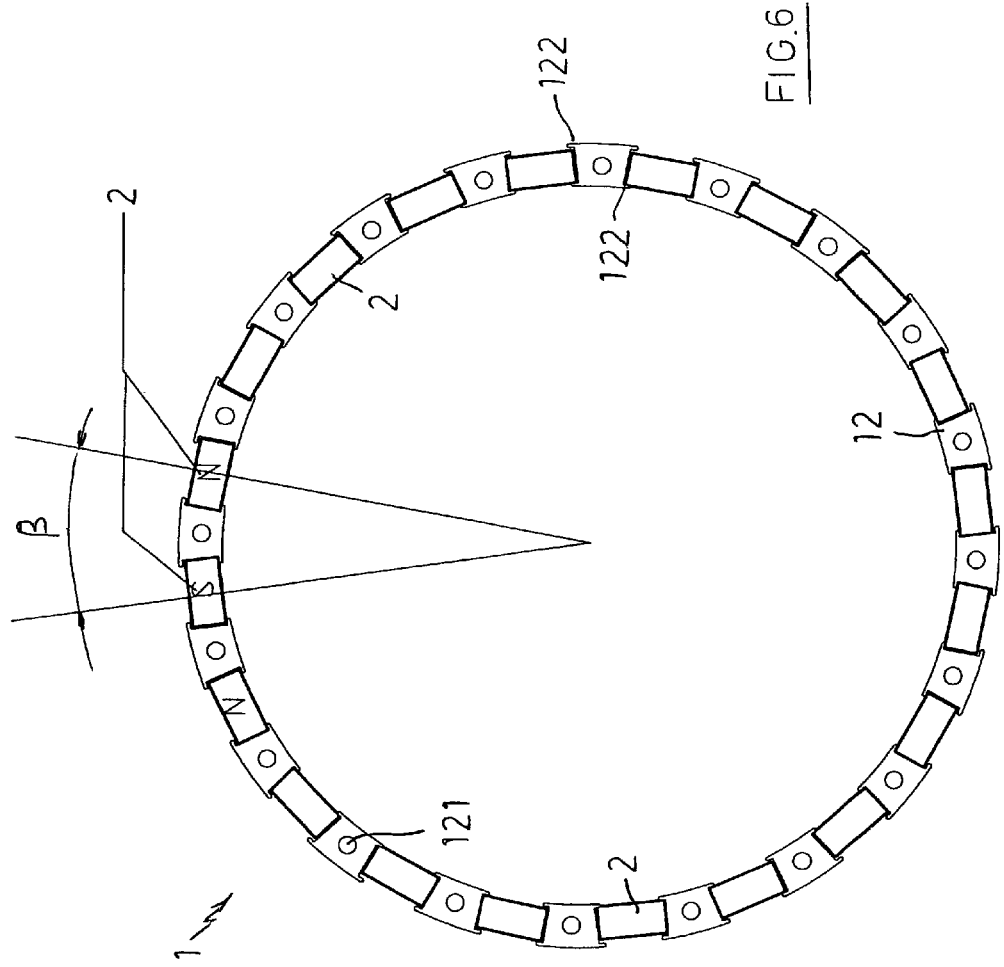
FIG. 6 shows a front view of the inductor shown in FIG. 5.
Figure 7C:
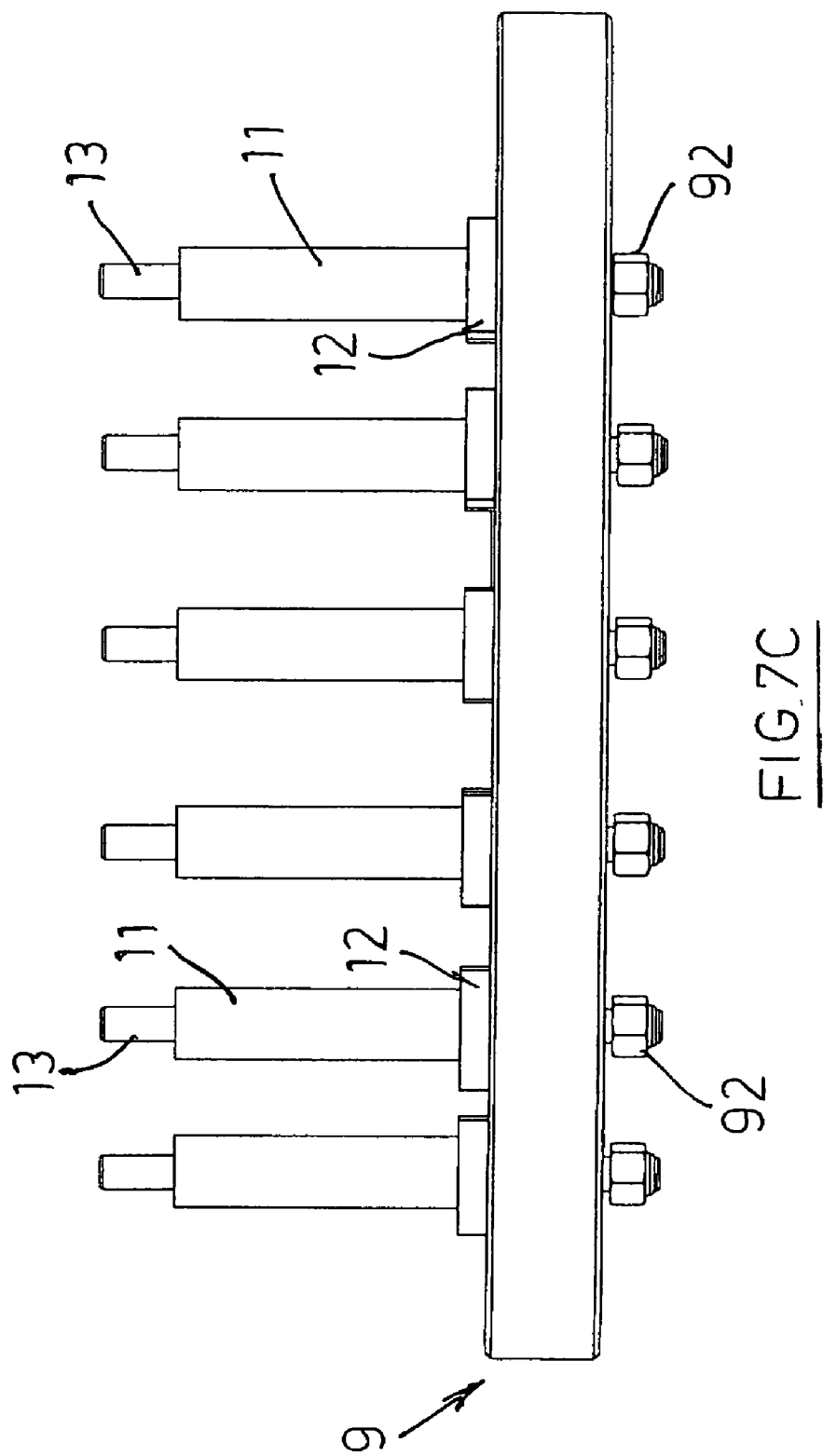
FIG. 7C is a schematic view showing another assembling procedure for the rotor of a machine according to the present invention.
Figure 7E:
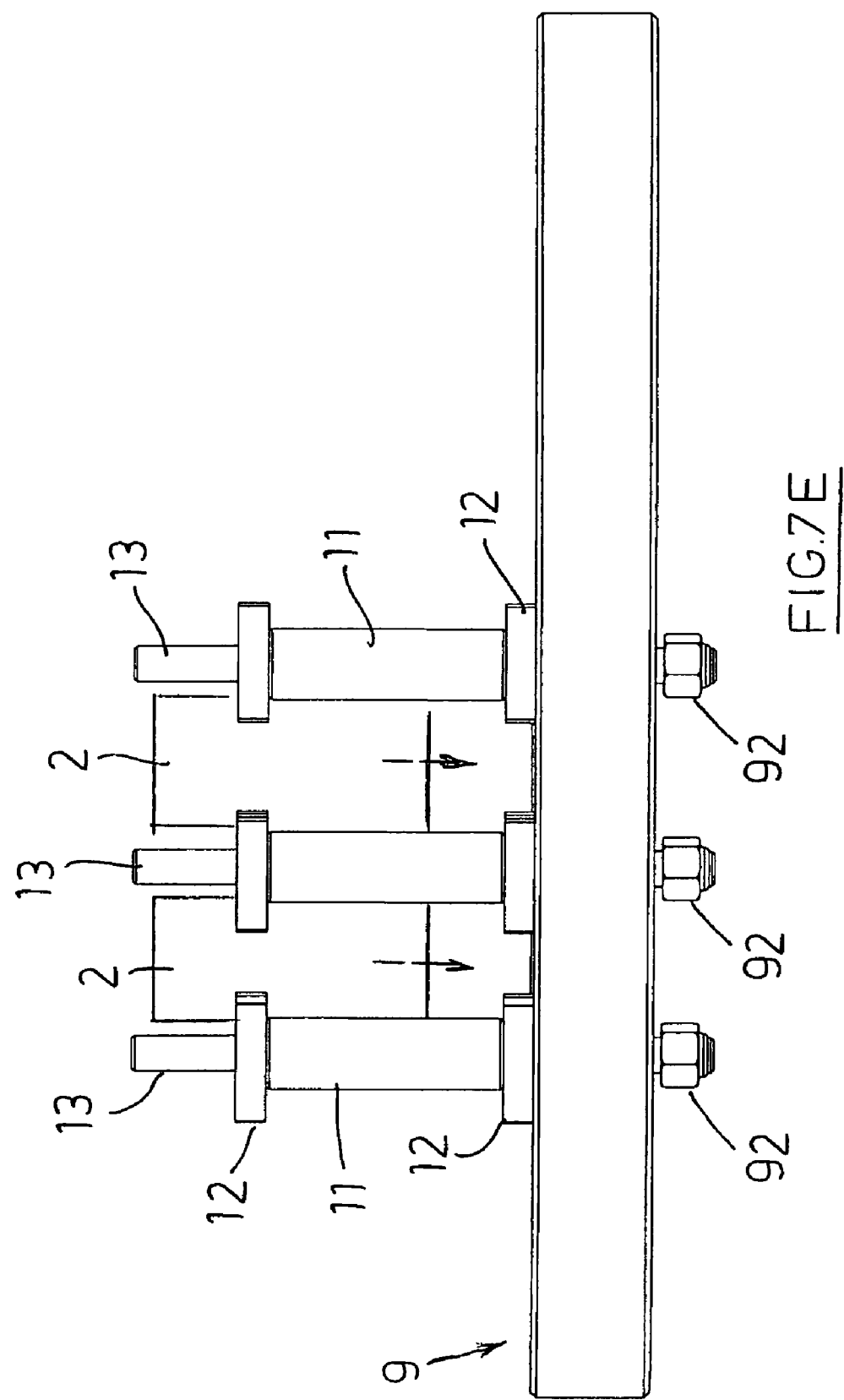
FIG. 7E is a schematic view showing another assembling procedure for the rotor of a machine according to the present invention.

FIGS. 5 and 6 show the annular disposition of the magnets (2) of the inductor (1). Preferably, said magnets are neodymium blocks. The magnets (2) are disposed so that their respective polarities (N, S) alternate along the ring they thus formed. Moreover, the magnets (2) are positioned with their long side parallel to the axis (x-x) of the machine.

With reference to the example shown in FIG. 5 and in FIG. 6, the inductor (1) comprises ten polar couples, so the magnets (2) of each polar couple are distanced with a value (β) which is equal to 18°.

FIGS. 7A-7G show a possible procedure for assembling the rotor (R) of a machine according to the present invention:

an annular flange (9) provided with angularly-equidistant holes (91) onto its external edge is provided;

a threaded rod (13) is introduced into each of said holes (91) and the threaded rods (13) are blocked perpendicularly to the flange (9) by—means of corresponding nuts (92) positioned on the external side of the flange (see FIG. 7 A);

then (see FIG. 7B), an element (12) is fitted onto each of said threaded rods (13), the element (12) consisting of a body having a "C" shaped transverse section featuring a flat central part with a passing hole (121) (see FIG. 5) and two arms (122) (see FIG. 5) on the opposite sides of said pierced central part which are perpendicularly oriented and bilaterally jut out from the same pierced part, so that the central part of the element (12) rests on the internal side of the flange (9) with its arms (122) oriented upwards; a tubular spacer (11) (see FIG. 7C) is subsequently positioned onto each of the threaded rods (13); —subsequently, a further element (12) is positioned onto each of the threaded rods (12), said element being identical to that described above—but its arms (122) are turned downwards (see FIG. 7D) so as to form an annular series of guides which are oriented perpendicularly to the flange;

at this point, (see FIG. 7 E) the magnets (2) are introduced into the previously formed guides;

now, onto the external sides of the elements (12) located on the spacers (11) a second flange (90) (see FIG. 1E) provided with a series of passing holes (93) (see FIG. 7G) is positioned such that through said holes the front ends of the threaded rods (13) are made to pass, then the second flange (90) is locked by means of a plurality of corresponding nuts (94) so that the inductor ring (1) is clamped between the first flange (9) and the second flange (90) as shown in FIG. 7 F. The flanges (9) and (90), the spacers (11) and the elements (12) are made of diamagnetic material.

It is possible to use, for example, a counter-flange (100) (see FIG. 7G) positioned in front of one of the flanges (9,90) solid to the inductor (1) to make the inductor (1) solid to the shaft (4) of the machine.

In the example shown in FIG. 7G and in FIG. 1E said counter-flange (100) is positioned behind the flange (9) and it is made solid to it by means of bolts (101) passing through corresponding holes foreseen both in the flange (9) and in the counter-flange (100). A keyer (110) engaging the external surface of the shaft (4) is disposed in the opening of the counter-flange (100). In this way, the rotation of the shaft (4) causes the corresponding rotation of the inductor (1).

Figure 8:
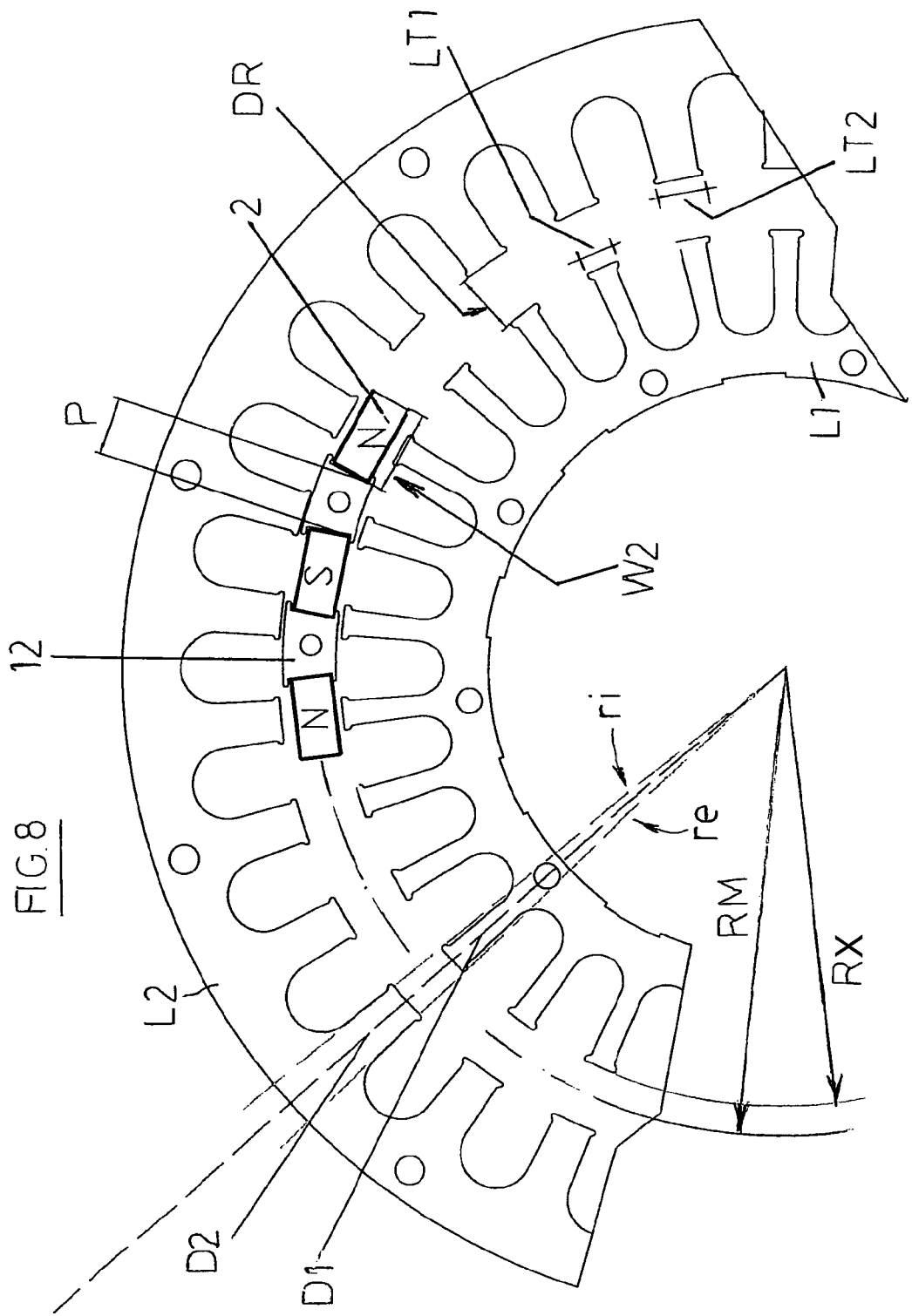
FIG. 8 is a schematic view showing the disposition of the rotor magnets with respect to the laminations of the internal and external rotor core, where the internal lamination is rotated by 6° to better highlight the dimensional relation between tooth D1 and tooth D2.

As illustrated in FIG. 1E, two bearings (43) are interposed between the shaft (4) and the hub (3). FIG. 8 shows the disposition of the magnets (2) with respect to the laminations (L1, L2) of the internal and external stator cores.

In practice, the magnets (2) move between the expansions (T1, T2) of the teeth (D1, D2) of the laminations (L1, L2) forming the internal stator core (S1) and external stator core (S1).

Figure 9:
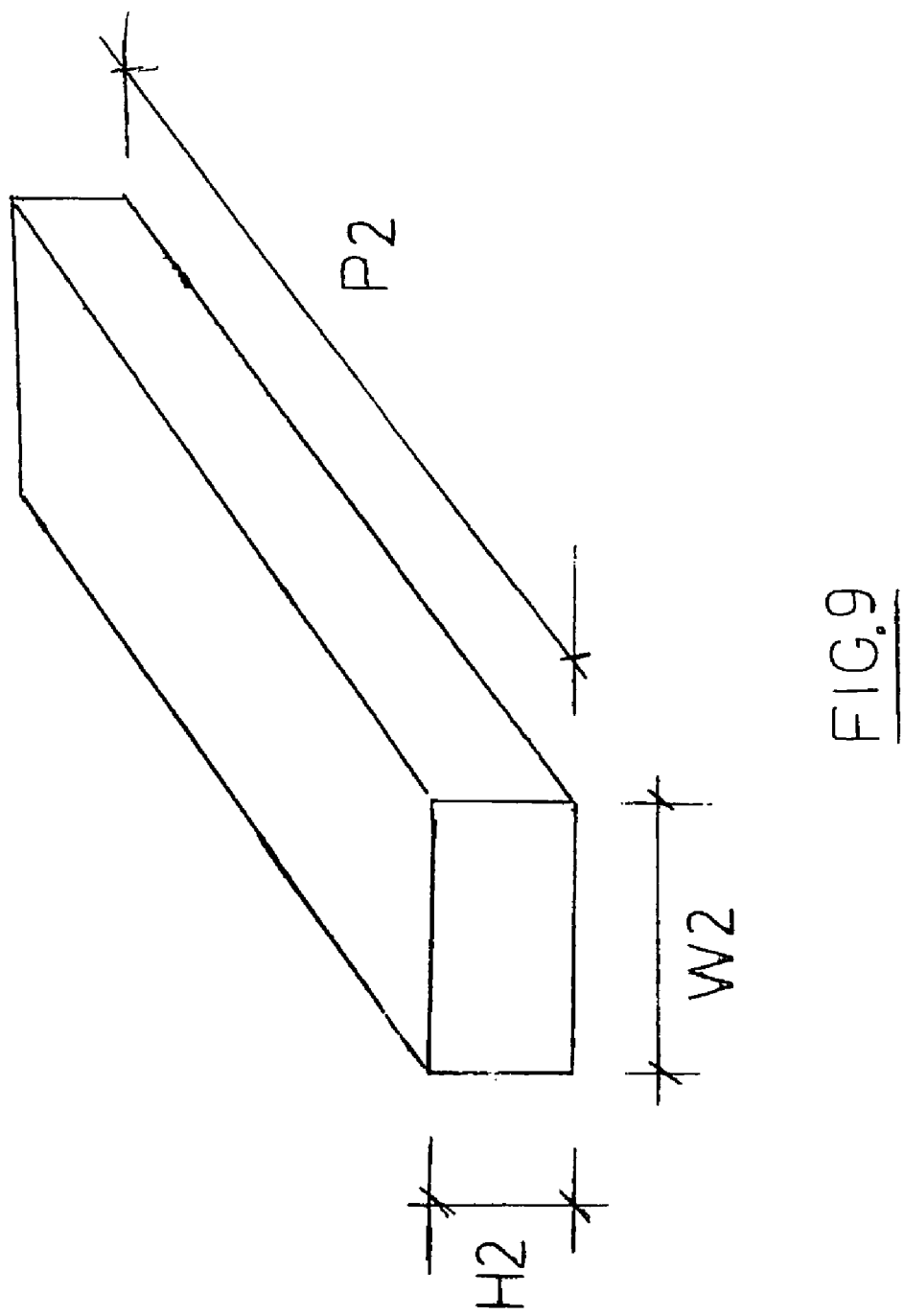
FIG. 9 is a schematic view showing a rotor magnet.

The magnets (2) can be neodymium parallelepipeds whose dimensional parameters (W2, H2, P2) are schematically indicated in FIG. 9.

The radial distance (DR) (see FIG. 8) between the expansions (T1, T2) of two facing teeth (D1, D2) of the laminations (L1, L2) is equal to the thickness (H2) of the magnets (2) increased by a predetermined value (for example 4 mm).

The width of the stems (G1) of the teeth (D1) (see FIG. 4A) of the internal laminations (L1) is preferably equal to 30% of the width (W2) of the magnets (2) and the width of their respective expansions (T1) is equal to 40% of said width (W2).

The width of the stems (G2) of the teeth (D2) (see FIG. 4B) of the external laminations (L2) is basically equal to the width of the expansions (T1) of the teeth (D1) of the internal laminations (width of the stems (G2)≈width of the stems (G1)). The width of the stems (G2) value relative to a tooth (D2) can also be determined thanks to the graphic construction indicated in the diagram of FIG. 8: two radiuses (ri, re) passing through the lateral edges of the expansion (T1) of the respective tooth (D1) are drawn from the common center of the laminations and, given the thickness (H2) of the magnets (2), that is, given the distance (DR) mentioned above, the width of the stems (G2) value is consequently defined by the chord of the circular arc delimited by said radiuses (ri, re), the radius of said circular arc being R=RX+DR where RX is the radius of the circumference along which the expansions (T1) of the internal laminations (L1) lie. The width of the expansions (T2) can be fixed at 110% of the width of the stems (G2) value. The "RX" value is determined starting from the medium radius (RM) of the inductor (1) and from the distance (DR) between the expansions of the teeth (D1) and (D2): RX=RM−1/2DR.

Moreover, the pitch (P) between the two consecutive magnets (2), measured between their respective counterfacing lower edges, preferably, has a value of 65%-70% of the width (W2) of the magnets.

Experimental tests have been conducted by using parallelepiped-shaped neodymium magnets (2) whose width (W2) is equal to 20 mm, whose thickness (H2) is equal to 10 mm and whose length (P2) is equal to 50 mm, and the values of said parameters (DR) and (P) are respectively 14 mm and 13.5 mm. This pitch value (P) corresponds to 67.5% of the width (W2) of the magnets. The inductor (1) used in the experimental tests had a medium radius (RM) of 110.35 mm.

As previously said, the core formed by the internal laminations (L1) is solid to the hub (3) thanks to the fact that it is locked between the ring (300) and the annular head (30) of the hub. Once this operation has been carried out, the bobbins (B1) (see FIG. 12) are positioned into the cavities delimited by the teeth of the internal laminations (L1). Said bobbins are disposed with their respective flanks in the spaces between the teeth of the laminations of the stator core (S1), then a plate (for example a fibreglass plate) is inserted between the upper part of the bobbins (B1) and the expansions (T1) of the teeth (D1) for definitely locking the bobbins. Within said spaces there are the flanks of two adjacent bobbins (B1).

Figure 10:
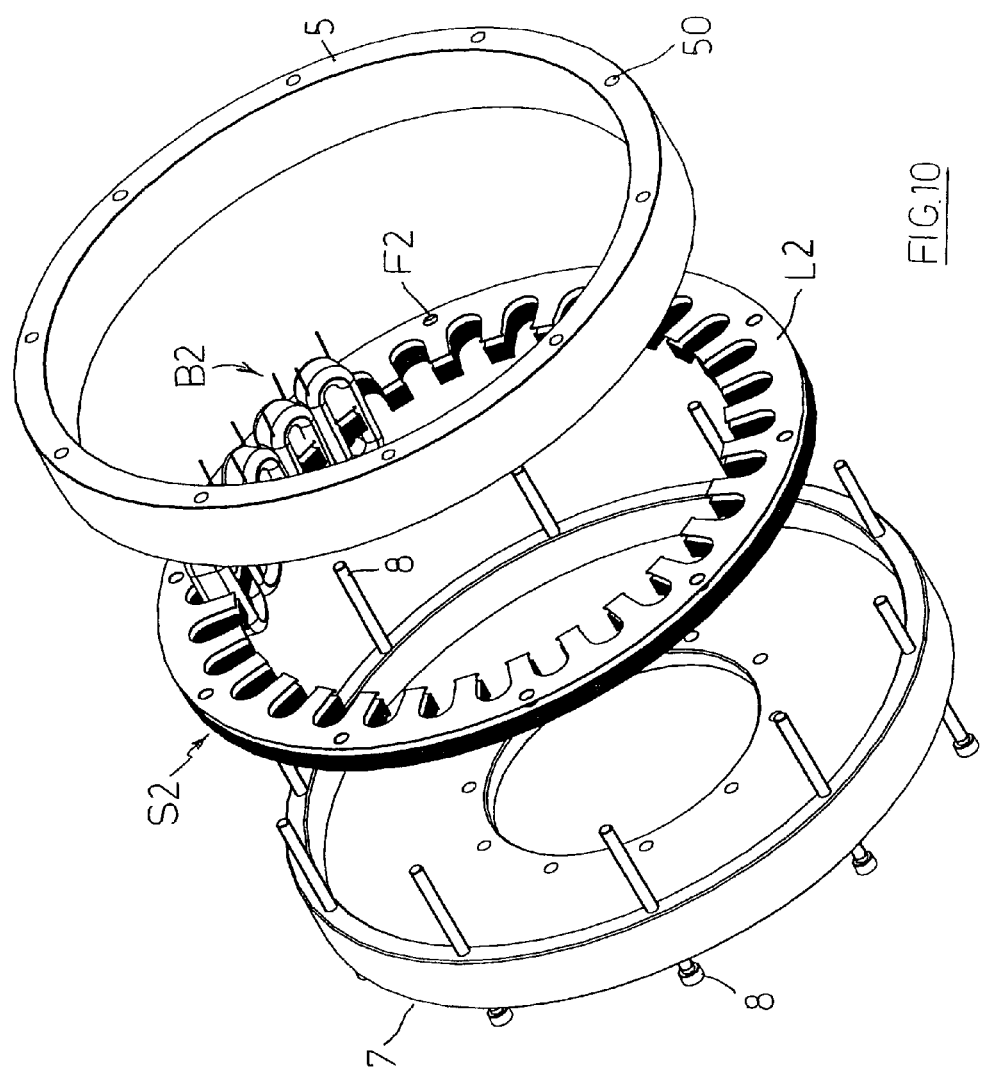
FIG. 10 is an exploded view of the internal stator group which features only some of the bobbins associated with the internal stator core.

Similarly, one can proceed for the external stator core (S2) which is locked between the flange (7) and the ring (5). The positioning and locking of the corresponding bobbins (B2) (see FIG. 10) takes place as described for the bobbins (B1) and the internal stator core (S1).

Figure 14:
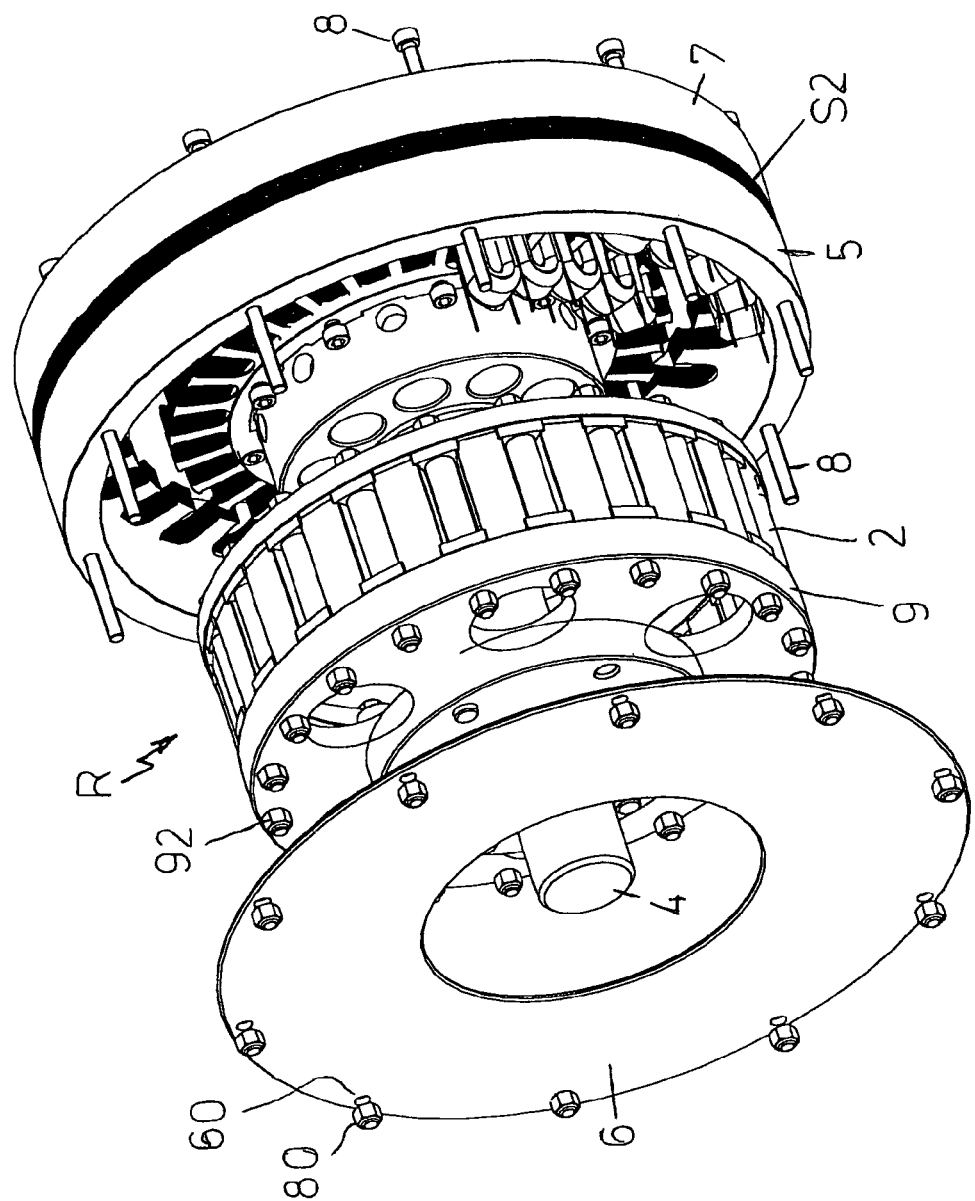
FIG. 14 is a schematic view showing an phase of assembling the present machine with the insertion of the rotor between the two stator groups.

As illustrated in FIG. 14, once the two stator units have been disposed, the rotor (R) is positioned between said units and the cover (6) is applied and fixed on the back of the rotor (R) by means of nuts tightened at the ends of the bolts (8) jutting out beyond the holes (60) of the cover (6).

From the above description it is evident that magnetic flow dispersion is reduced to the minimum, by forming the stator unit with two groups (S1, S2) which are located both above and underneath the magnets (2) included in the rotor unit (R). The particular constructive simplicity of the machine is evident as well.

It is pointed out that the term "inductor" has been used under the hypothesis of a machine functioning as an electric generator. This term, however, should not be considered in a limitative sense as the present invention can also be employed in the realization of electric motors. In practice, the construction details may vary in any equivalent way as far as the shape, dimensions, elements disposition, nature of the used materials are concerned, without nevertheless departing from the scope of the adopted solution idea and, thereby, remaining within the limits of the protection granted to the present patent for industrial invention.

While specific embodiments of the invention have been shown and described in detail to illustrate the application of the principles of the invention, it will be understood that the invention may be embodied otherwise without departing from such principles.

The invention claimed is:

1. A method for assembling a rotor of an electric machine including the rotor rigidly attached with a shaft having a longitudinal axis and made by a plurality of identical permanent magnets forming a rotor ring, each of said permanent magnets being a parallelepiped body, the method comprising the following operative steps:
    providing a first annular flange;
    forming a plurality of fixed linear guides onto a side of said first annular flange, said guides being angularly regularly spaced and orthogonal to the flange on which said guides are formed;
    inserting the permanent magnets in said guides and sliding the magnets towards said first flange;
    positioning of a second annular flange on said guides;
    locking of said second annular flange to said guides, so that said magnets are clamped, inside said guides, by the first annular flange and the second annular flange, wherein said guides are formed by:
    inserting a rod through each of a plurality of passing holes provided in said first annular flange and locking the rods orthogonally to said first annular flange;
    fitting, on each of said rods, a body having a central portion comprising a passing hole and two side arms on opposite sides with respect to the central part, said arms being orthogonal to said central part of the body, said body being positioned with said central portion bearing on the first annular flange and with said arms turned upwardly;
    fitting a tubular spacer on each of said rods;
    fitting, on each of said rods, a further body with a central portion having a further passing hole and two further side orthogonal arms, said two further side orthogonal arms being turned downwardly, toward said first flange.

2. A method according to claim 1, wherein said second annular flange is locked by means of said rods, each of said rods having an end locked to the first annular flange and an end locked to the second annular flange.

3. A method according to claim 1, wherein said permanent magnets are made of neodymium.

4. A method according to claim 1, wherein each of said permanent magnets has a predetermined width, height and length and has a lower edge opposite to the lower edge of an adjacent magnet, wherein a distance between the lower edges of adjacent magnets comprises between 65% and 70% of said width.

5. A method according to claim 4, wherein said distance is 67.5% of said width.

* * * * *